(12) United States Patent
Glassman

(10) Patent No.: US 9,953,278 B2
(45) Date of Patent: *Apr. 24, 2018

(54) SYSTEM AND METHODS FOR INTERACTING WITH NETWORKED HOME APPLIANCES

(75) Inventor: Ellen T. Glassman, Closter, NJ (US)

(73) Assignee: SEARS BRANDS, L.L.C., Hoffman Estates, IL (US)

( * ) Notice: Subject to any disclaimer, the term of this patent is extended or adjusted under 35 U.S.C. 154(b) by 188 days.

This patent is subject to a terminal disclaimer.

(21) Appl. No.: 13/462,474

(22) Filed: May 2, 2012

(65) Prior Publication Data

US 2012/0316984 A1    Dec. 13, 2012

Related U.S. Application Data

(60) Provisional application No. 61/481,294, filed on May 2, 2011.

(51) Int. Cl.
G06Q 30/00 (2012.01)
G06Q 10/06 (2012.01)
G06Q 50/06 (2012.01)

(52) U.S. Cl.
CPC ............ *G06Q 10/06* (2013.01); *G06Q 50/06* (2013.01)

(58) Field of Classification Search
CPC ................................................ G06Q 30/0631
USPC ....................................................... 705/26.7
See application file for complete search history.

(56) References Cited

U.S. PATENT DOCUMENTS

| | | | |
|---|---|---|---|
| 6,204,763 B1 * | 3/2001 | Sone | 340/568.1 |
| 6,549,818 B1 | 4/2003 | Ali | |
| 7,136,940 B2 * | 11/2006 | Roh | F25D 29/00 345/169 |
| 7,340,414 B2 | 3/2008 | Roh et al. | |
| 7,689,476 B2 | 3/2010 | Crisp, III | |
| 8,170,695 B2 * | 5/2012 | Spicer | G05B 15/02 700/22 |
| 8,705,715 B2 * | 4/2014 | Park | H04B 11/00 379/102.01 |
| 2001/0010032 A1 * | 7/2001 | Ehlers | G05B 15/02 702/62 |
| 2001/0042391 A1 * | 11/2001 | Wobkemeier | D06F 39/005 68/12.02 |
| 2001/0049846 A1 * | 12/2001 | Guzzi et al. | 8/158 |
| 2002/0178066 A1 * | 11/2002 | Roh | G06Q 30/06 705/22 |
| 2004/0144136 A1 * | 7/2004 | Mae et al. | 68/12.19 |
| 2005/0154496 A1 * | 7/2005 | Chapman et al. | 700/278 |
| 2006/0271437 A1 | 11/2006 | Maggio | |
| 2007/0129812 A1 * | 6/2007 | Ferchau | 700/1 |

(Continued)

OTHER PUBLICATIONS

Lu et al., "SmartGridLab: A Laboratory-Based Smart Grid Testbed" 2010.*

*Primary Examiner* — Alexis M Casey

(74) *Attorney, Agent, or Firm* — McAndrews, Held & Malloy, Ltd.

(57) ABSTRACT

An appliance having a processing device and at least one sensor in communication with the processing device gathers data indicative of usage of a consumable with the appliance. The gathered data is used to determine an amount of the consumable remaining and, when the amount of the consumable remaining is at a predetermined level, a notification is provided to indicate to a user that the consumable needs to be replaced.

23 Claims, 35 Drawing Sheets

(56) References Cited

U.S. PATENT DOCUMENTS

| | | | |
|---|---|---|---|
| 2008/0177678 A1* | 7/2008 | Di Martini | G01D 4/002 |
| | | | 705/412 |
| 2009/0288453 A1* | 11/2009 | Lee et al. | 68/17 R |
| 2010/0102051 A1* | 4/2010 | Ebrom et al. | 219/520 |
| 2010/0106521 A1* | 4/2010 | Ashrafzadeh et al. | 705/3 |
| 2010/0106624 A1* | 4/2010 | Ashrafzadeh et al. | 705/28 |
| 2010/0217550 A1* | 8/2010 | Crabtree | H02J 3/005 |
| | | | 702/62 |
| 2010/0262313 A1* | 10/2010 | Chambers | G06Q 10/04 |
| | | | 700/295 |
| 2010/0281625 A1* | 11/2010 | Oh et al. | 8/137 |
| 2010/0306927 A1* | 12/2010 | Oh et al. | 8/137 |
| 2011/0040651 A1 | 2/2011 | Swamy et al. | |
| 2011/0060553 A1 | 3/2011 | Han et al. | |
| 2011/0082599 A1* | 4/2011 | Shinde | H02J 13/0003 |
| | | | 700/295 |

\* cited by examiner

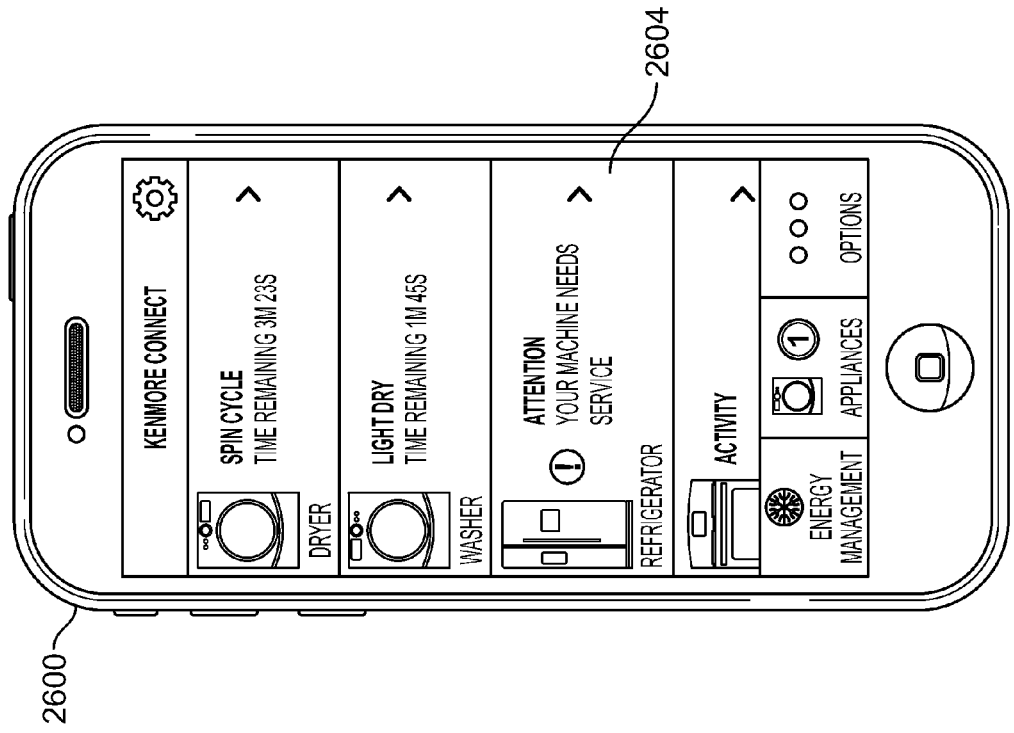
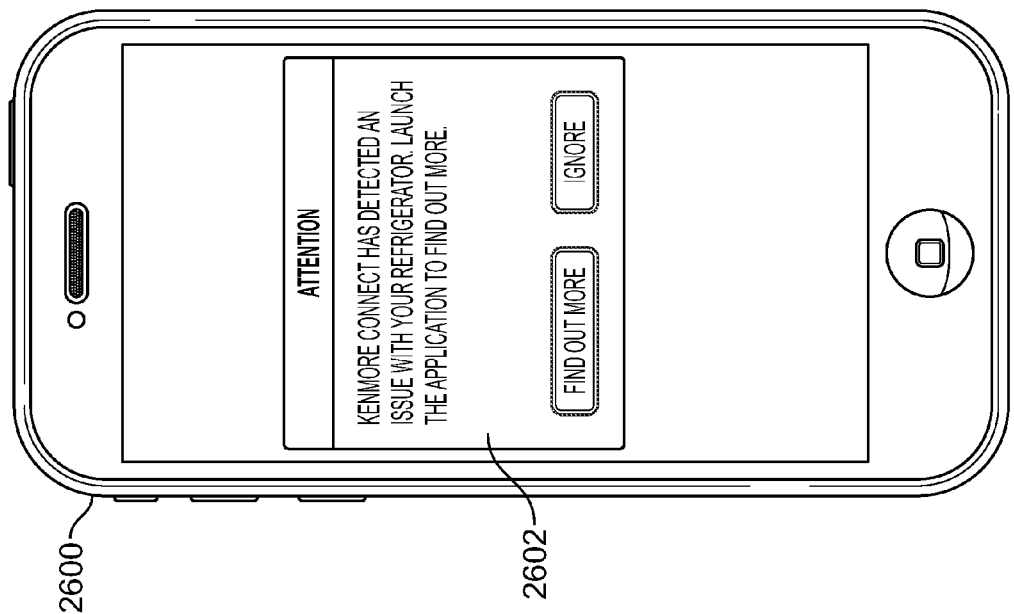
FIG. 26B
FIG. 26A

SYSTEM AND METHODS FOR INTERACTING WITH NETWORKED HOME APPLIANCES

CROSS REFERENCE TO RELATED APPLICATION

This application is a non-provisional application claiming priority from U.S. Provisional Application Ser. No. 61/481,294, filed May 2, 2011, entitled "System and Methods for Interacting with Networked Home Appliances," and incorporated herein by reference in its entirety.

FIELD OF THE DISCLOSURE

The subject invention generally relates to networked appliances. More particularly, the subject invention relates to systems and methods for interacting with networked home appliances.

BACKGROUND

Networked appliances are generally known in the art. By way of example, U.S. Published Application No. 2011/0060553 describes a home appliance that functions to output product information as a sound signal. A service center remotely performs fault diagnosis of the home appliance by receiving the sound signal, detecting the product information from the sound signal, and checking the state of the home appliance using diagnostic data that is also included in the product information.

In addition, U.S. Pat. No. 7,340,414 describes a refrigerator capable of transmitting and receiving information over a network and having an automatic food ordering function. Residual amounts of food articles stored in containers of the refrigerator are measured through sensors installed in the containers and then displayed on a screen of a display unit, thereby enabling a user to easily recognize the residual amounts of the food articles stored in the refrigerator without opening the door of the refrigerator. The measured residual amounts of the food articles are compared with minimum proper amounts of the food articles preset by the user. In the case where the measured residual amount of a specific one of the food articles is smaller than the minimum proper amount of the specific food article, the specific food article is automatically ordered and delivered.

Still further, U.S. Pat. No. 7,136,940 describes an Internet refrigerator and a Web pad for operating the same. The Web pad is detachably mounted on the Internet refrigerator, and transmits and receives data to/from the Internet refrigerator on the basis of a remote display protocol. The Web pad is a client Web pad detachably mounted on an outer surface of the Internet refrigerator. The client Web pad is adapted to receive a display signal transmitted from the Internet refrigerator and output the received display signal externally. A server control unit is provided to transmit the display signals to the client Web pad on the basis of the remote display protocol such that data processed in the Internet refrigerator is displayed through the client Web pad. Application programs and multimedia data are driven on the basis of the server control unit, resulting in a reduction in work-load on the client Web pad.

Yet further, U.S. Pat. No. 6,549,818 describes a cooking appliance, such as a stove or oven, which has the ability to download cooking recipes from the Internet. The recipes include a food list and pre-cooking directions which are displayed to a user. The recipes also include a cooking temperature schedule which is used by the temperature controller of the food-heating unit to automatically assist in heating the appliance in accordance with the recipes.

While such exemplary networked appliances work for the described purposes, a need exists for improved networked appliances which provide a multitude of advantages not yet seen in the art.

SUMMARY

While the foregoing provides a general overview of some of the various features and functionalities of the subject invention, a better understanding of the objects, advantages, features, properties and relationships of the subject invention will be obtained from the following detailed description and accompanying drawings which set forth illustrative embodiments and which are indicative of the various ways in which the principles of the subject invention may be employed.

BRIEF DESCRIPTION OF THE DRAWINGS

FIG. 26 is a graphical representation of a mobile device showing several possible diagnostic alerts that might be presented to a consumer regarding one or more networked appliances.

DETAILED DESCRIPTION

The following description of example methods and systems is not intended to limit the scope of the description to the precise form or forms detailed herein. Instead, the following description is intended to be illustrative so that others may follow its teachings.

Figure 1:
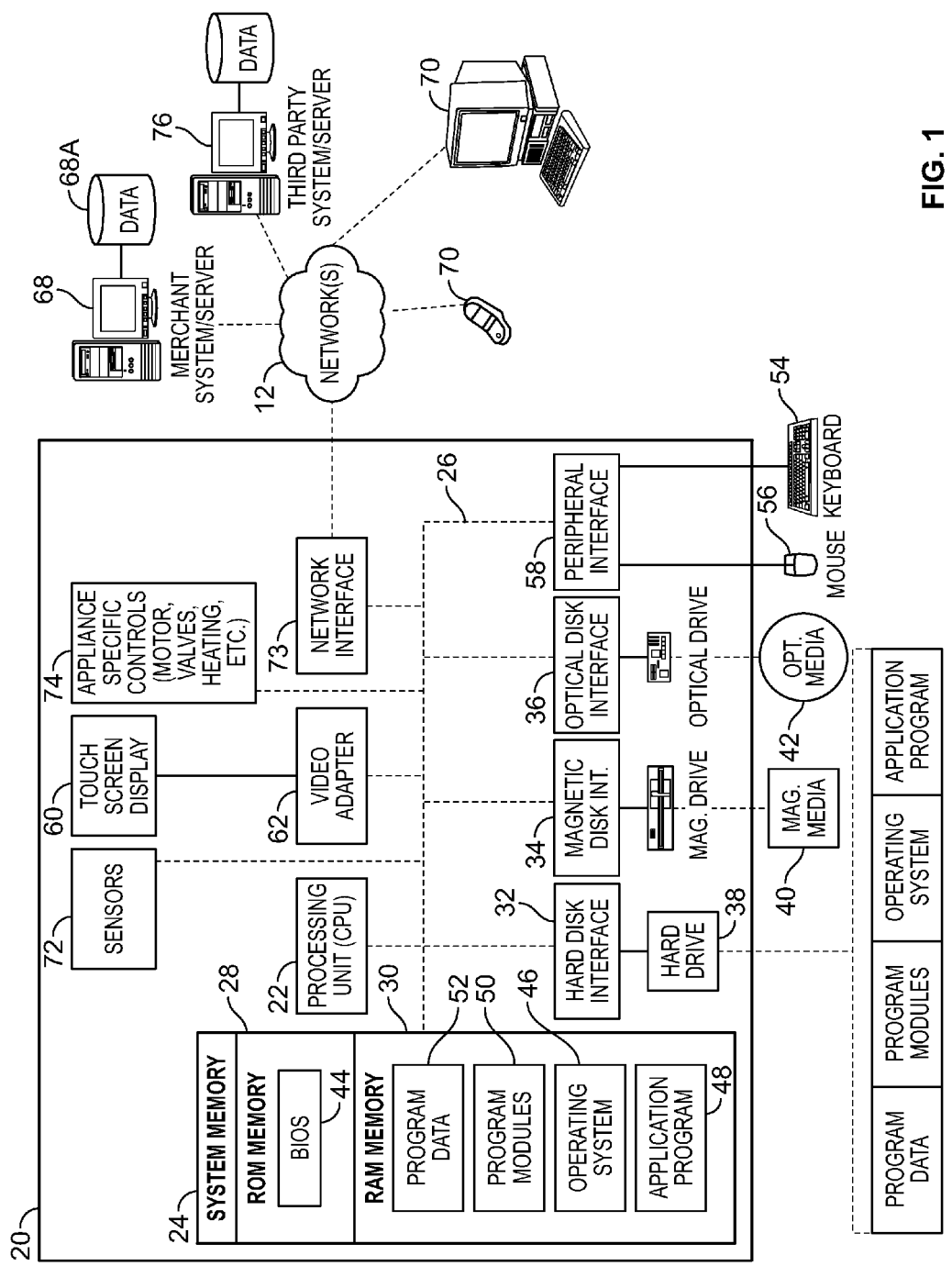
FIG. 1 is a system diagram of an example of a networked home appliance.

With reference to the figures, the following describes various systems and methods for using networked appliances to, among other things, assist in simplifying and/or managing household tasks, conserve energy, save time, improve efficiency, provide diagnostic and/or repair services, provide engaging social services, facilitate remote control operations, and the like. To this end, an exemplary appliance 20, such as a washing machine, clothes dryer, heater, refrigerator, furnace, freezer, oven, or the like, is illustrated in FIG. 1 as having many of the components commonly used in otherwise conventional computer systems as well as components and executable instructions that would be specific to any tasks a given appliance is required to perform, e.g., to control a motor, to control water flow, to control heating elements, etc.

More particularly, to enable the appliance 20 to perform its various tasks, the appliance 20 preferably includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer readable instructions, data structures, program modules and other data for the processing device 20. Those skilled in the art will further appreciate that other types of computer readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the appliance 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser, social networking application, or other applications), other program modules 50, and/or program data 52 as required. Such computer-executable instructions may be downloaded to one or more of the memory devices as needed, for example via a network connection.

To allow a user to enter commands and information into the appliance 20, input devices such as a touch pad display 60, a keyboard 54, and/or a pointing device 56 are provided. While not illustrated, other input devices may include a microphone, a joystick, a game pad, a scanner, a camera, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a display 60 may also be connected to the bus 26 via an interface, such as a video adapter 62. In addition to the display 60, the processing device 20 may also include other peripheral output devices, not shown, such as speakers and printers. The various peripheral devices may be integrated into the appliance 20 or may be removably attached to the appliance 20 as desired. As needed for any particular purpose, the appliance 20 may also receive input from various sensors 72 (e.g., water level sensors, heat sensors, usage sensors, etc.) and the instructions stored in memory may be used to control various appliance specific hardware components 74 (e.g., motors, valves, heating elements, etc.).

Figure 31:
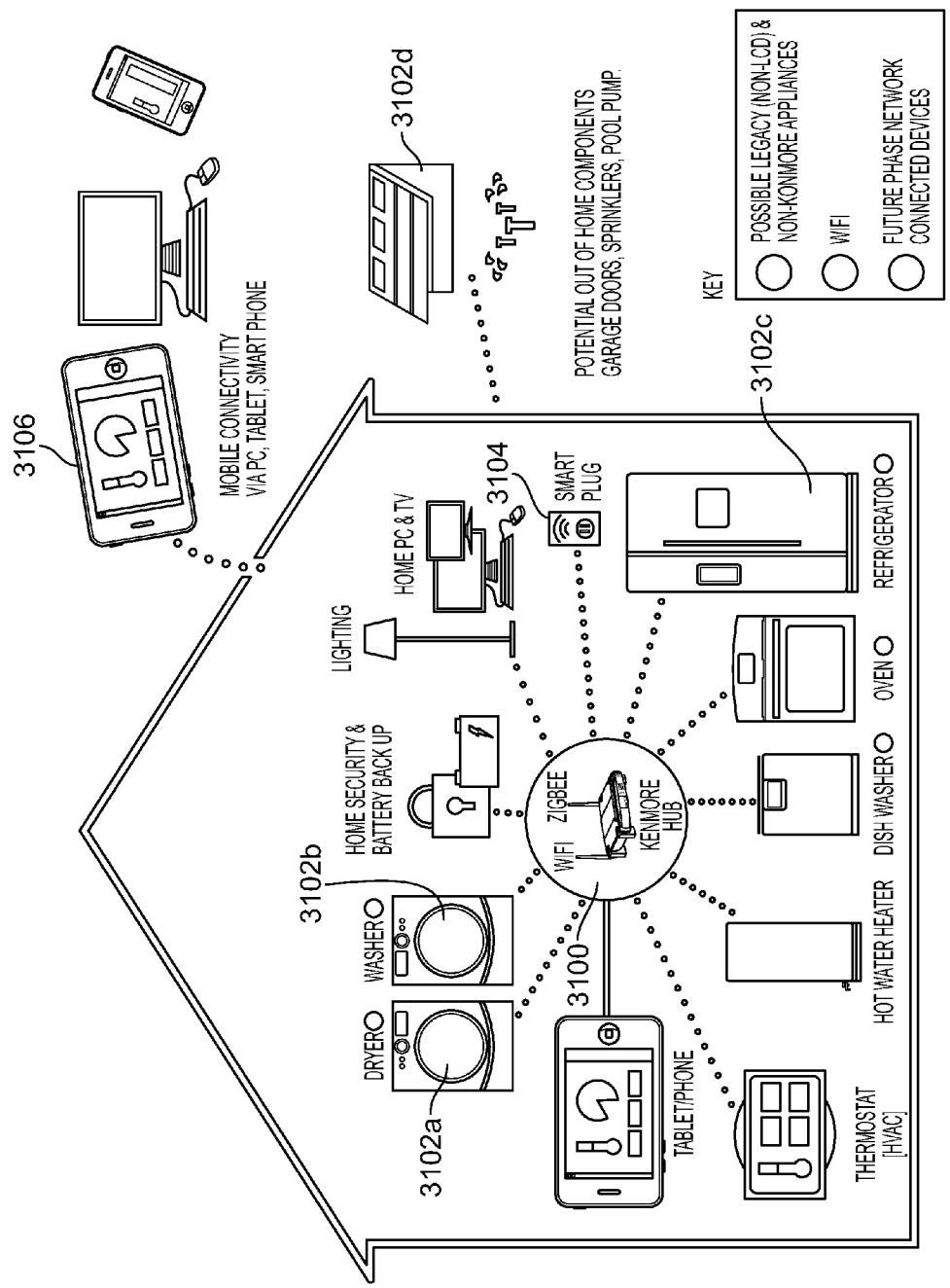
FIG. 31 is a system diagram of a series of possible networked home appliances.

As noted, the appliance 20 may also utilize logical connections to one or more remote processing devices, such as the host system server 68 having associated data repository 68A. In this regard, while the host system server 68 has been illustrated in the exemplary form of a computer, it will be appreciated that the host system server 68 may be any type of device having processing capabilities. It will be appreciated that the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems 76 via the network 12 and, via such connections, will be associated with data repositories that are associated with such other third party systems 76. Such third party systems 76 may include, without limitation, systems of banking, credit, or other financial institutions, systems of third party providers of goods and/or services, systems of shipping/delivery companies, systems that support social networking, etc. Through the networking capabilities of the appliance 20, information related to the operation, state, etc. of the appliance 20, control of the appliance 20, and the like may be made accessible to other computing devices 70, such as smart phones, desk-top computers, tablet computers, etc. either directly or indirectly via such intermediate computing device 3106 such as illustrated in FIG. 31.

For performing tasks as needed, the host system server 68 may include many or all of the elements described above relative to the appliance 20. In addition, the host system server 68 would generally include executable instructions for, among other things, managing and/or monitoring various tasks associated with the operation of the appliance 20. By way of example only, the instructions may receive data related to use of consumables with the appliance and, based upon this data, recommend maintenance procedures for the appliance, order replacement product as needed, and the like. Communications between the appliance 20 and the host system server 68 may be exchanged via a further processing device, such as a network router, that is responsible for network routing. Communications with the network router may be performed via a network interface component 73. Thus, within such a networked environment, e.g., the Internet, World Wide Web, LAN, or other like type of wired or wireless network, it will be appreciated that program modules depicted relative to the appliance 20, or portions thereof, may be stored in the memory storage device(s) of the host system server 68.

Figure 2:
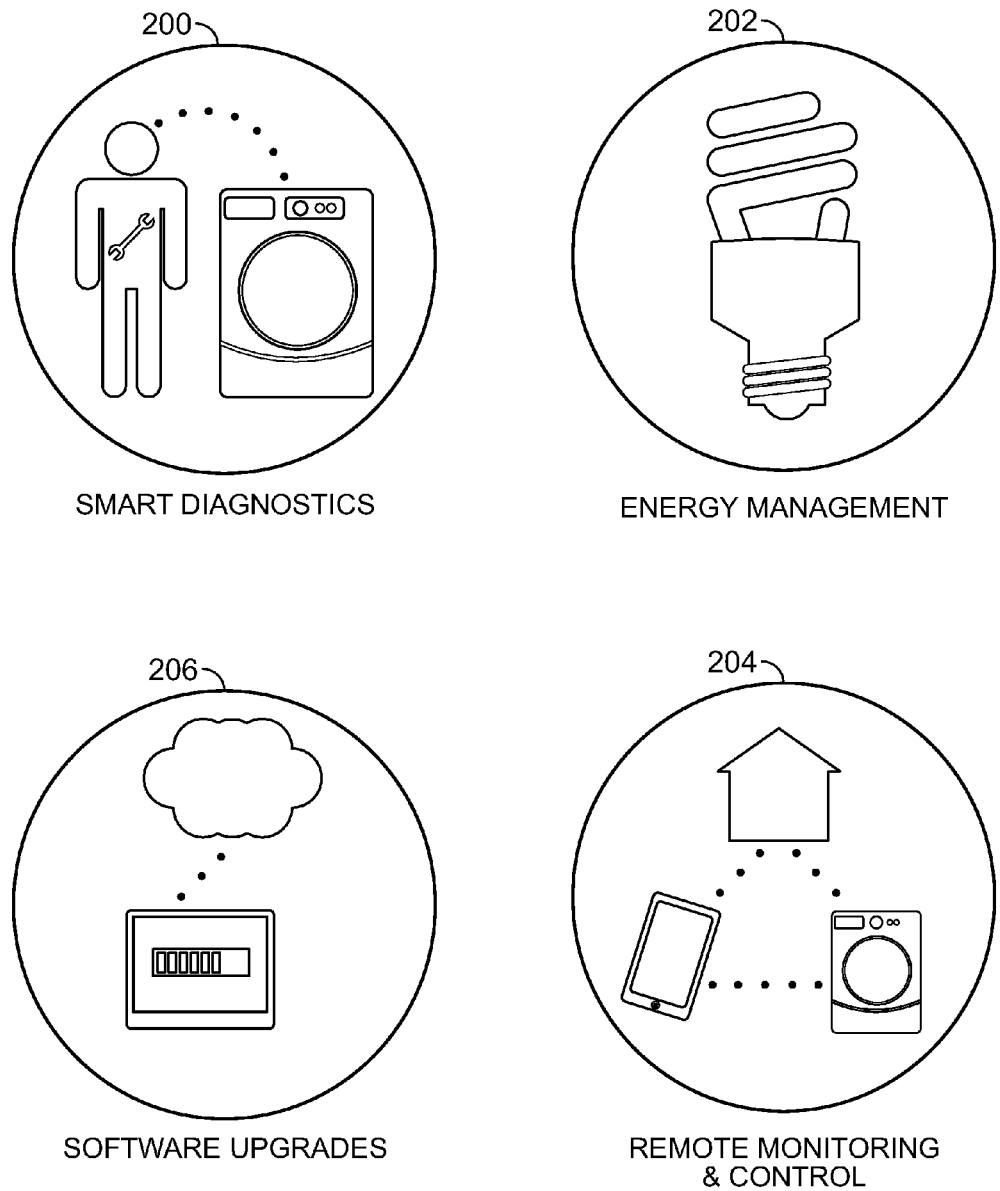
FIG. 2 is a graphical representation of the networking capabilities of the networked home appliance of FIG. 1.

To provide the various advantages above-noted, the networking capabilities of the appliance 20 are intended to be leveraged to provide at least smart diagnostics 200, energy management 202, remote monitoring and control 204, or software upgrades 206 as generally illustrated in FIG. 2.

Figure 3:
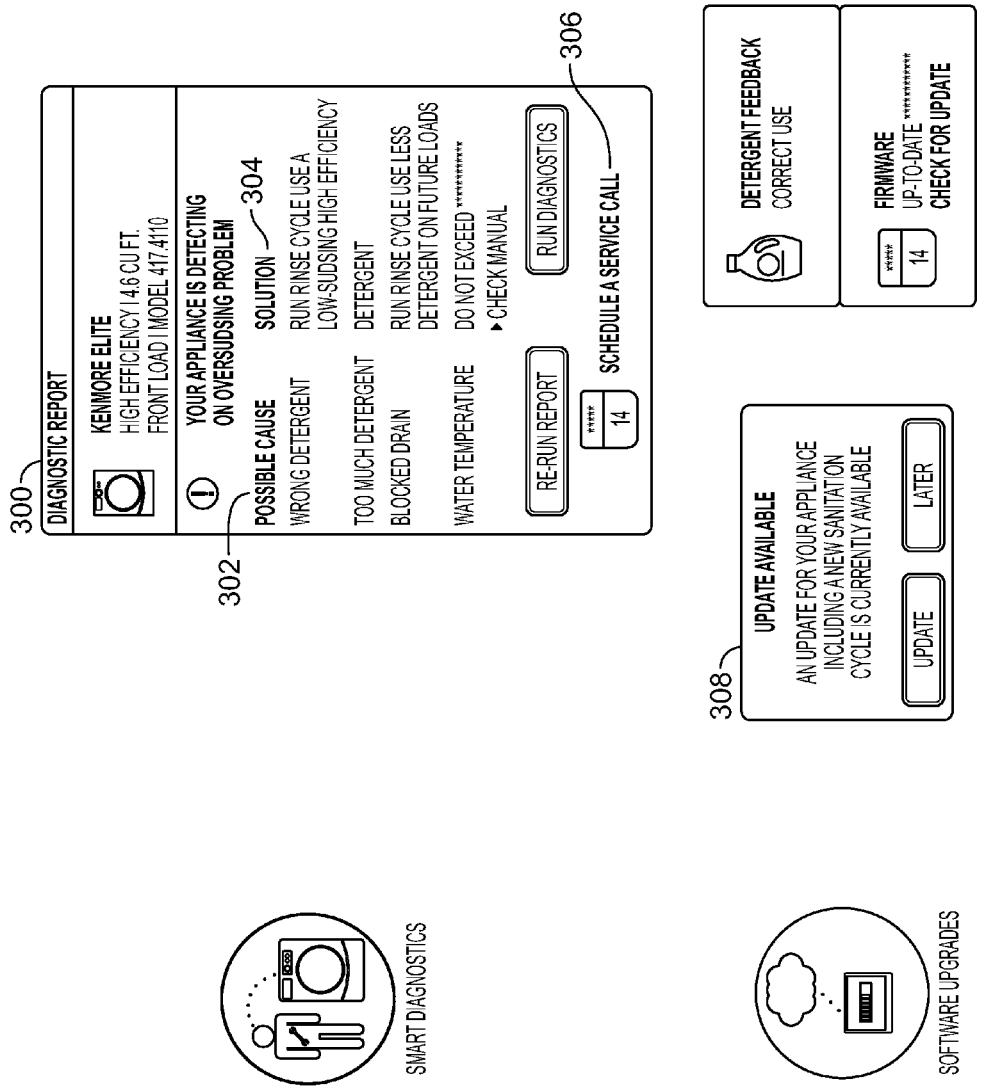
FIG. 3 depicts the diagnostic and upgrade capabilities of a networked home appliance.

With respect to smart diagnostics 200, it is contemplated that data gathered by one or more of the sensors 72 can be provided to a service center associated with a remote server 68 whereupon such data can be evaluated and a diagnostic report generated for display at the appliance 20 and/or at another device 70. By way of example, a diagnostic report 300 can include an indication of any perceived problems as determined via an analysis of the received data, describe possible causes for a problem 302, and describe possible solutions 304 for the problem 302 as generally illustrated in FIG. 3. In addition, the diagnostic report 300 can provide an interface 306 whereby the consumer can directly schedule a repair visit with a repair services provided as needed.

With respect to software upgrades 206, an indication that updated software/firmware is available for the appliance 20 may be displayed to the consumer as also illustrated in FIG. 3. Such an upgrade notification 308 may be sent automatically or in response to a consumer requesting a check for such upgrades as desired. When a software upgrade is available, the consumer may download the software/firmware from the network and update the software/firmware of the appliance 20 at their convenience. In addition, the consumer may be provided with access to the server 68 which provides helpful hints or interactive dialogues directed to uses of consumables with their appliance 20, such as detergent used in association with a washing machine.

Figure 4:
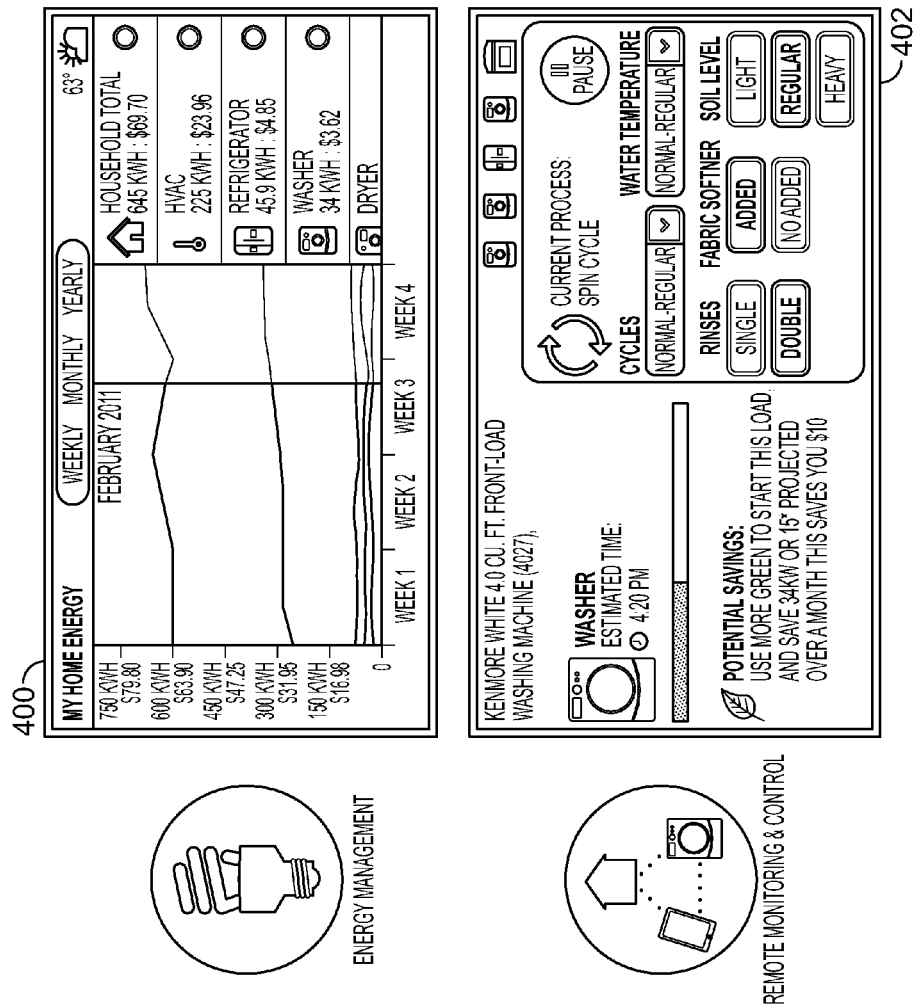
FIG. 4 depicts the energy management and remote monitoring and control capabilities of a networked home appliance.

With respect to energy management 202, the electrical consuming characteristics of one or more appliances may be monitored via the sensors 70 associated with the appliance 20 and the data gathered from such sensors may be used to provide the consumer with, for example, a graphical depiction of energy costs 400 associated with using such appliances 20 as illustrated in FIG. 4. Data related to such energy usage may be collected from the appliances 20 by the server 68 and the graphical depictions of the energy costs 400 associated with using the appliances 20, as created by the server 68, may then be viewed using remote terminals 70.

With respect to remote monitoring and control 204, the sensors 70 associated with the appliance 20 may also monitor the operating state of the appliance 20 and provide such information to the remote terminal 70, either directly or via the server 68. The remote terminals 70 would include software for displaying information related to such operating states, as illustrated in FIG. 4, as well as for receiving user input to remote control the operation of such appliances. The data received via a consumer interaction with the user interface elements presented in a control panel for a given appliance 402 such as illustrated in FIG. 4 may likewise be directly communicated to the appliance 20 or indirectly via the server 68. Upon receiving such data, the operating software of the appliance 20 will function to program/control the appliance as instructed in an otherwise conventional manner. Such user interface 402 may additionally provide the user with costs and/or cost savings tips associated with operating the appliance in a desired manner at a given time.

Figure 5:
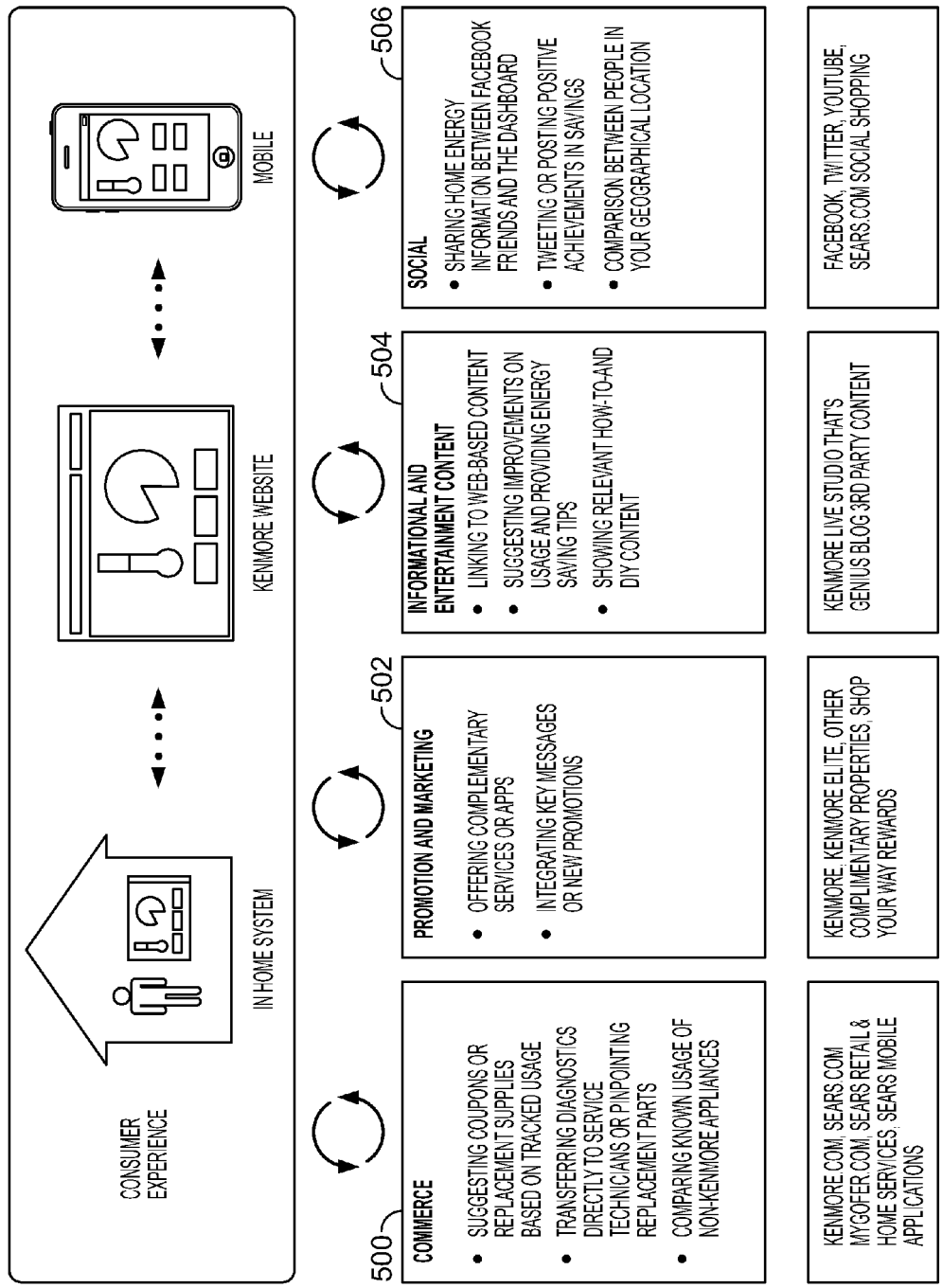
FIG. 5 is a graphical representation of the consumer experience with the subject system.

As further illustrated in FIG. 5, the consumer experience with the system, i.e., the appliance(s) 20 in their home, the website services of the server(s) 68, and the terminal(s) 70, may be further enhanced by making available to the consumer various applications and by layering the various services obtainable thereby in a cloud computing environment. By way of example, a consumer may download for use at the appliance 20 and/or terminal 70 applications with specific purposes.

For example, as illustrated in FIG. 5, the consumer may download a commerce application, such as an application 500 to suggest coupons or replacement supplies—which supplies may be automatically ordered for the consumer—based on sensed usage of a consumable with the appliance 20, such as detergent used with a dishwasher, an application, e.g., an app, to transfer diagnostic information directly to a service technician or to locate replacement parts based upon sensed conditions of the appliance 20, to compare energy costs between appliances, etc.

In another example, the consumer may download a promotion and marketing application 502 for receiving offers for products or applications complementary to the appliance 20 (or usage thereof), an application for receiving messages related to the appliance 20 (or usage thereof), etc.

In yet still another example, the consumer may download an information and entertainment application 504 for linking to web-based content, for suggesting improvements on appliance usage and/or providing energy savings tips, and/or for accessing how-to and do-it-yourself instructions, videos, etc.

Finally, in still another example, the consumer may download a social application 506 for sharing appliance related information with Facebook friends, for tweeting or posting achievements in savings using the appliance 20, and/or for comparing information with other appliance users in a geographical area, etc.

Figure 6:
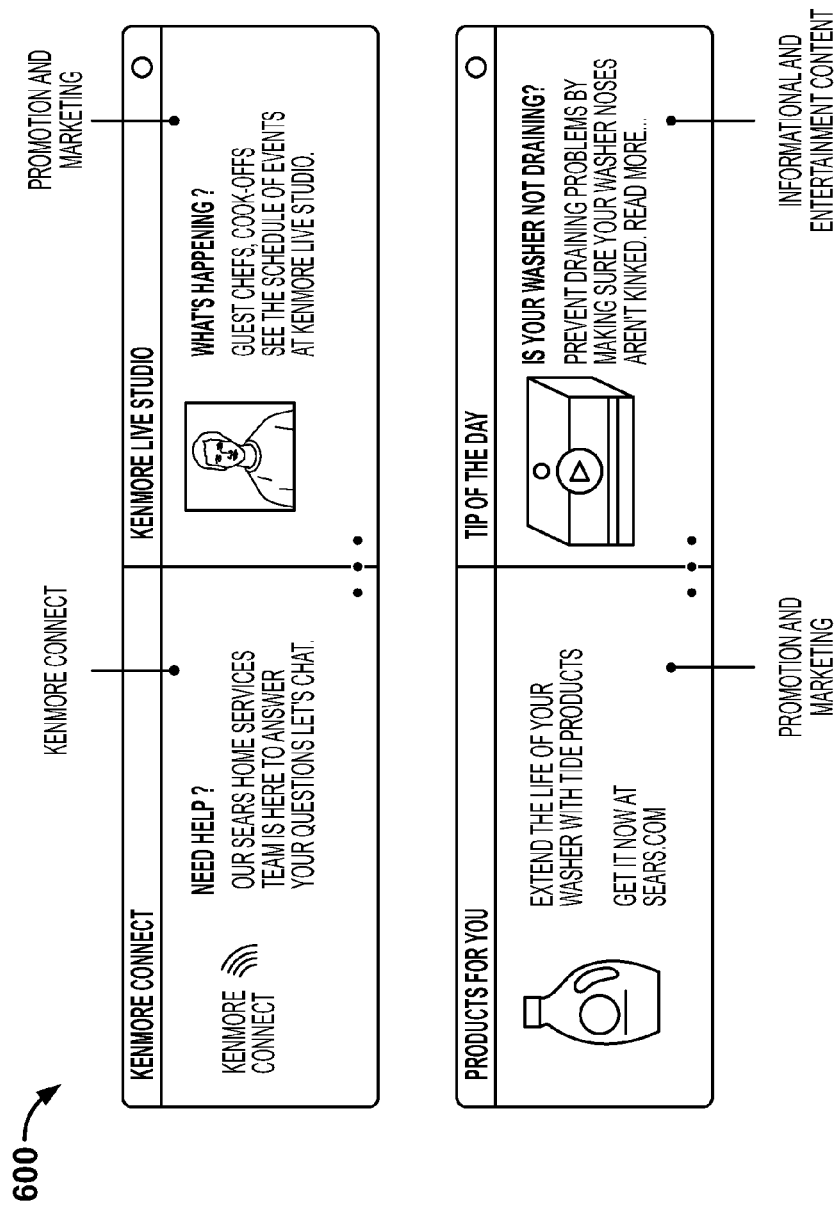
FIG. 6 is a graphical representation of an application in which a consumer may invoke a connection to a home service team.
Figure 7:
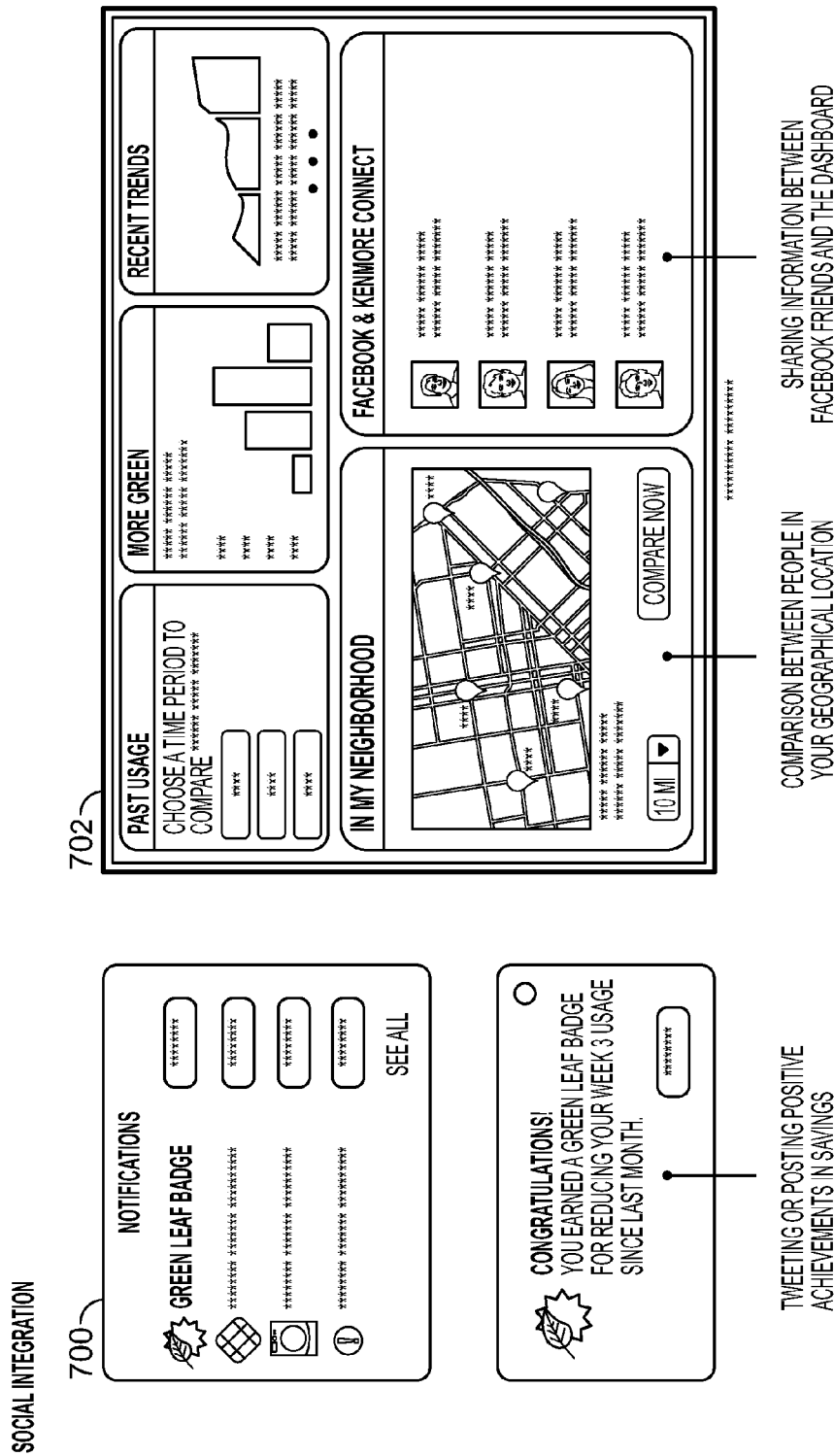
FIG. 7 is a graphical representation of social networking applications used to share information regarding a networked home appliance.

By way of more particular example, FIG. 6 illustrates an application 600 whereby the consumer may invoke a connection to a home service team to get answers to questions via textual or video chat, an application whereby the consumer may access video promotional materials related to appliance usage, demonstrations, and the like, an application whereby the consumer may receive coupon offers and links to purchase items related to their appliance(s) 20, and an application whereby the consumer may subscribe to feeds such as tips for using their appliance(s) 20, etc. while FIG. 7 illustrates an application 700 whereby the consumer can share "badges" earned via use of the appliance 20 (as determined by the appliance itself or its usage as monitored by server(s) 68) with others on a social network, an application 702 for displaying information, such as comparative usage information, related to appliances located within a given geographic area, an application for viewing appliance usage trends, an application for generally viewing information posted to social networking sites, etc.

Exemplary screen layouts/dashboards for presenting such appliance related information to consumers e.g., to monitor appliance usage, control an appliance, interact with social components, etc., by means of one or more applications provided to appliances 20 and/or devices 70, e.g., tablet computers, smart phones, etc., are depicted in FIGS. 8-30 by way of non-limiting example.

Figure 8:
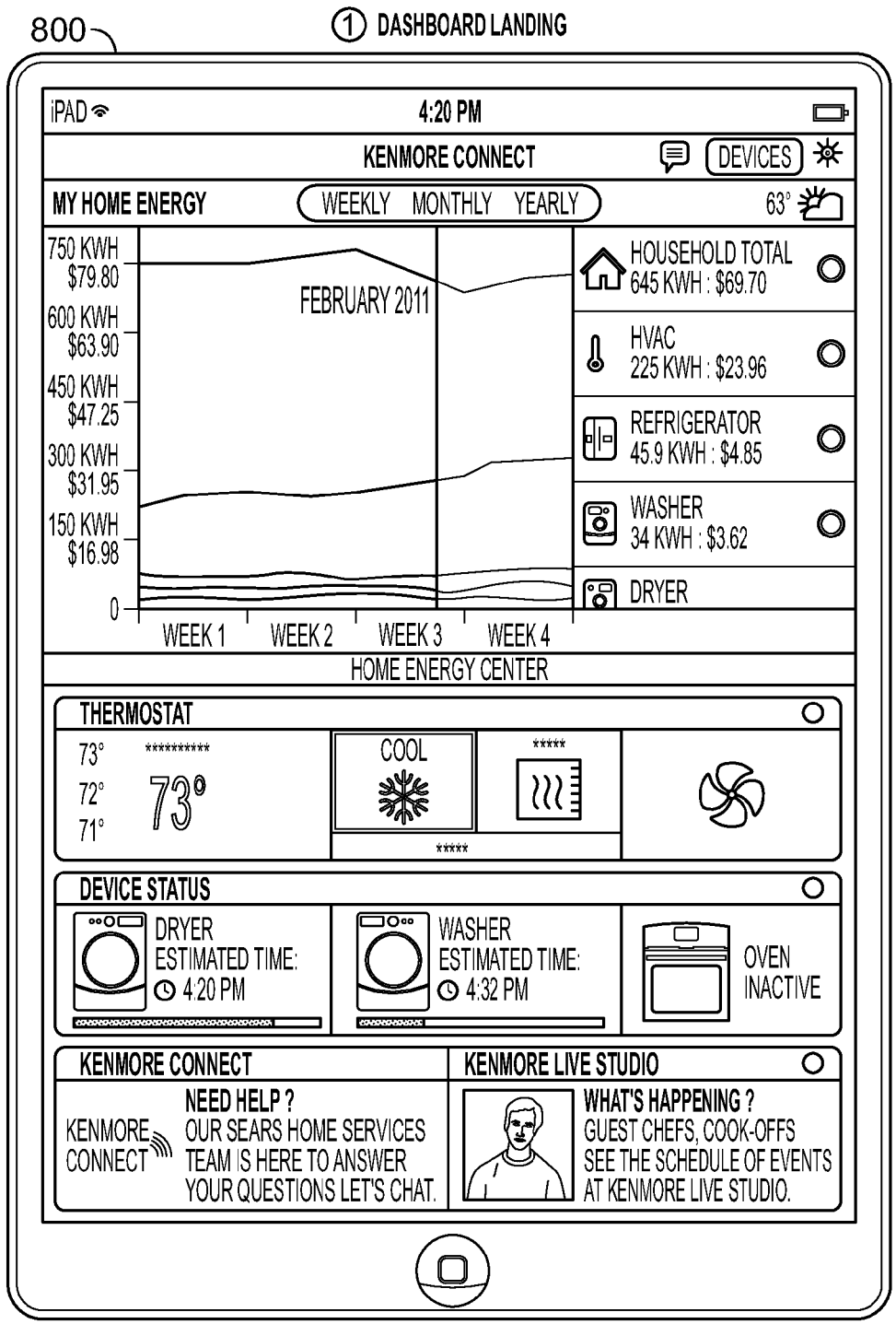
FIG. 8 is a graphical representation of a portrait-oriented tablet device showing one possible screen layout/dashboard that presents networked home appliance information to a consumer.
Figure 9:
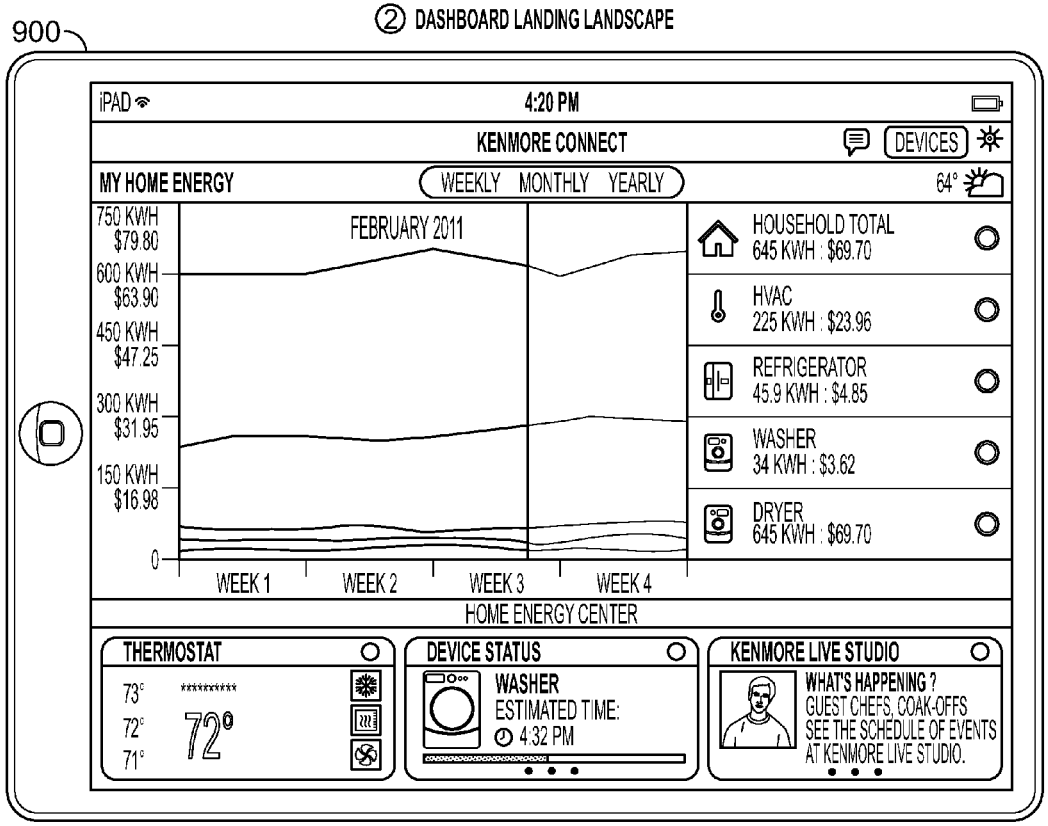
FIG. 9 is a graphical representation of a landscape-oriented tablet device showing one possible screen layout/dashboard that presents networked home appliance information to a consumer.

Exemplary screen layouts/dashboards may present appliance related information to consumers in, among other orientations, portrait or landscape format, depending on consumer preference and readability. By way of example, FIG. 8 illustrates a portrait-oriented screen layout/dashboard 800 for presenting information to consumers. By way of further example, FIG. 9 illustrates a landscape-oriented screen layout/dashboard 900 for presenting information to consumers. Alternative screen layout/dashboard orientations may be employed to best present information to consumers.

Figure 10A:
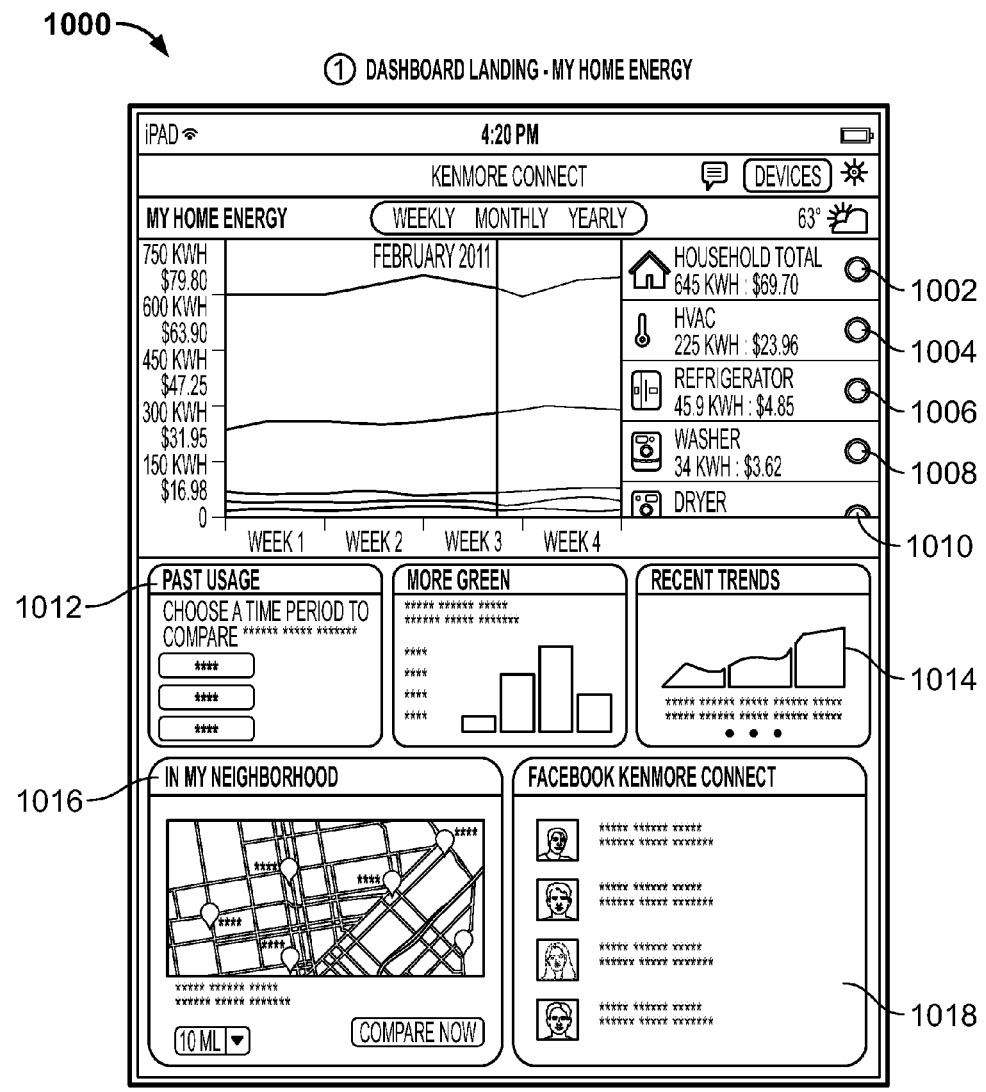
FIG. 10 is a graphical representation of home energy center and device screen layout/dashboard to present networked home appliance information to consumers.
Figure 10B:
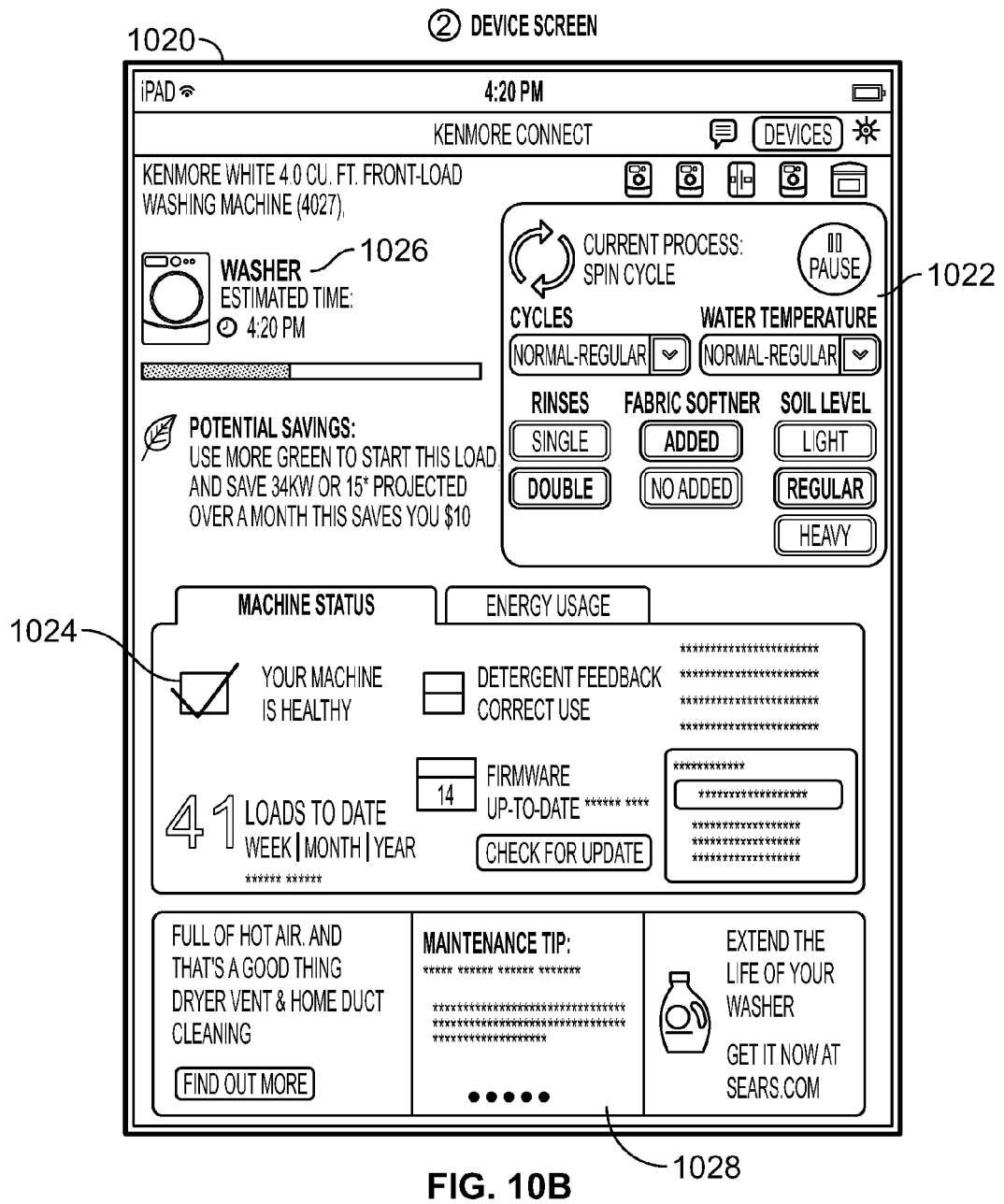

FIG. 10 illustrates a home energy center screen layout/dashboard 1000 that presents information to the consumer regarding the consumer's individual home energy consumption. The home energy center screen layout/dashboard 1000 presents information regarding total household energy consumption 1002, heating, ventilation, and air conditioning energy consumption 1004, refrigerator energy consumption 1006, washer energy consumption 1008, and dryer energy consumption 1010. The home energy center screen layout/dashboard 1000 may also present information regarding the energy consumption of other networked home appliances. The home energy center screen layout/dashboard 1000 may also present information regarding the consumer's past energy usage 1012 and the consumer's trends in recent energy usage 1014. The home energy center screen layout/dashboard 1000 may further present location information of the networked home appliances 1016. The home energy center screen layout/dashboard 1000 may also present social networking information 1018 to the consumer. It is contemplated that many alternative formats may be used to present information to the consumer regarding the consumer's individual home energy consumption.

FIG. 10 further illustrates a device screen layout/dashboard 1020 for presenting information to the consumer regarding an individual networked home appliance. The information presented to the consumer on the device screen layout/dashboard 1020 will depend on the individual networked home appliance featured on the device screen layout/dashboard 1020 at any given time. By way of example, if the consumer desires to know more information regarding a networked washer appliance, the consumer could select, e.g., activate, depress, and/or touch, the washer 1008 from the home energy screen layout/dashboard 1000 to navigate to the device screen layout/dashboard 1020. From the device screen layout/dashboard 1020, the consumer might be presented with information such as the current load status of the washer 1022, the general status of the washer 1024, a general description of the washer 1026, and a link to learn tips about using the washer 1028. The consumer can navigate to other networked appliances to learn more information regarding those appliances by selecting the appropriate networked appliance from the home energy screen layout/dashboard 1000.

Figure 11A:
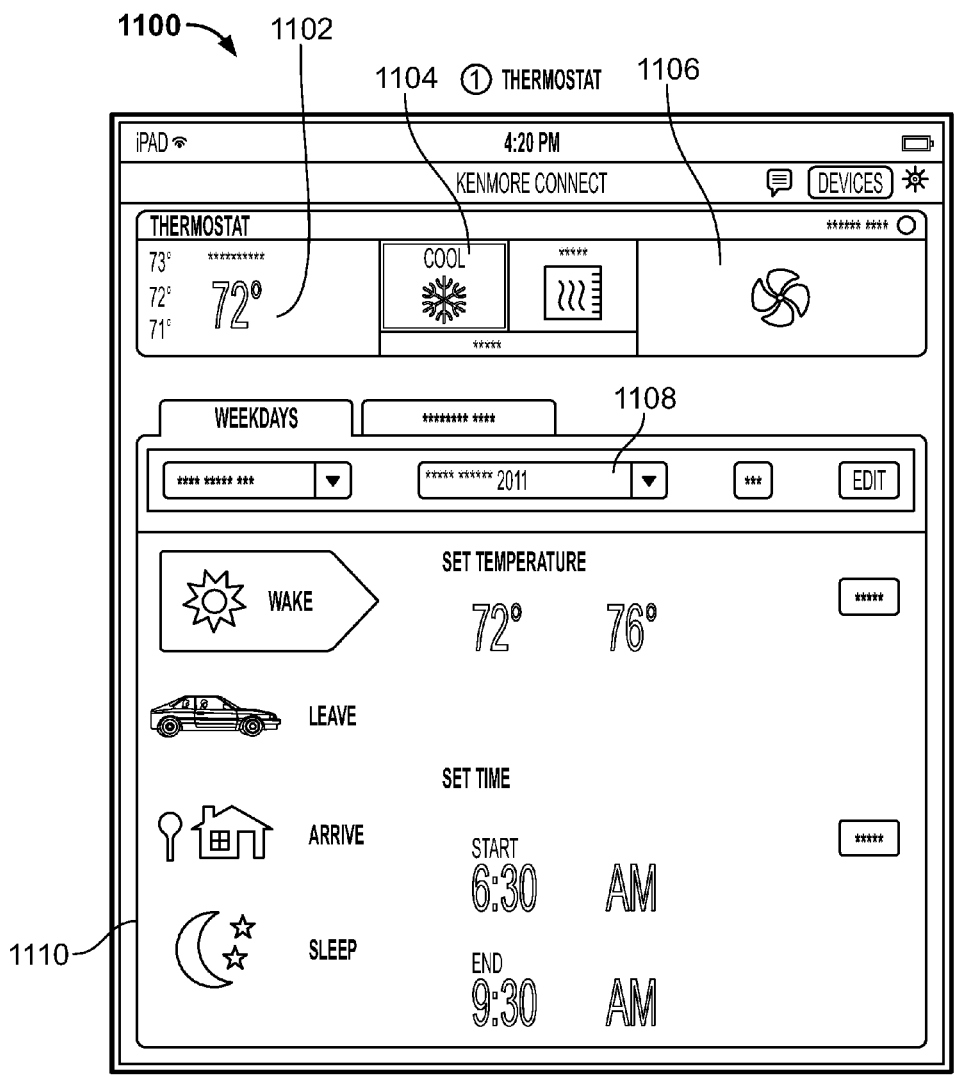
FIG. 11 is a graphical representation of thermostat and home services live chat screen layouts/dashboards that presents networked home appliance information to a consumer.
Figure 11B:
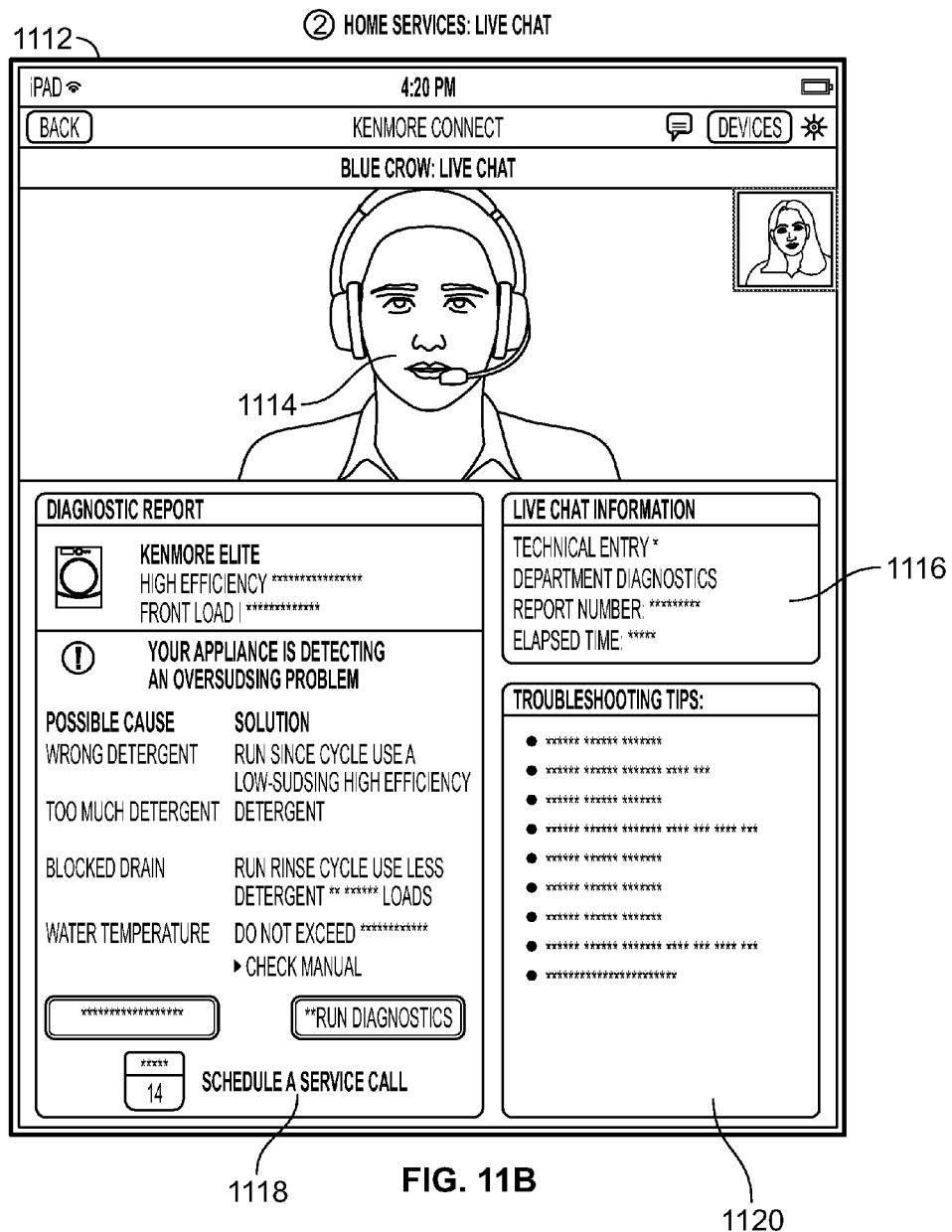

FIG. 11 illustrates a thermostat screen layout/dashboard 1100 for presenting information to a consumer regarding thermostat settings. The thermostat screen layout/dashboard may present information regarding the current temperature 1102, whether the air conditioning or heat is currently running 1104, advanced fan controls 1106, a drop-down menu for the consumer to select a pre-configured thermostat setting 1108 (whether pre-configured by the consumer or by a third-party), and/or temperature and timing information 1110 regarding the pre-configured thermostat setting 1108. The consumer may edit temperature and/or timing information for a pre-configured thermostat setting 1108. The consumer also may create a new thermostat setting.

FIG. 11 further illustrates a home services live chat screen layout/dashboard 1112. The consumer may engage in real-time conversation with a service technician 1114 to diagnose and solve various problems with the consumer's networked home appliances. The real-time conversation may involve video, audio, and/or textual components. The home services live chat screen layout/dashboard 1112 may present specific information regarding the live chat, such as the technician's name and department number, a report number for the live chat, and perhaps the elapsed time of the live chat 1116. The home services live chat screen layout/dashboard 1112 might also present troubleshooting tips 1120 and a diagnostic report 1118 for the consumer's problematic networked home appliance.

Figure 12:
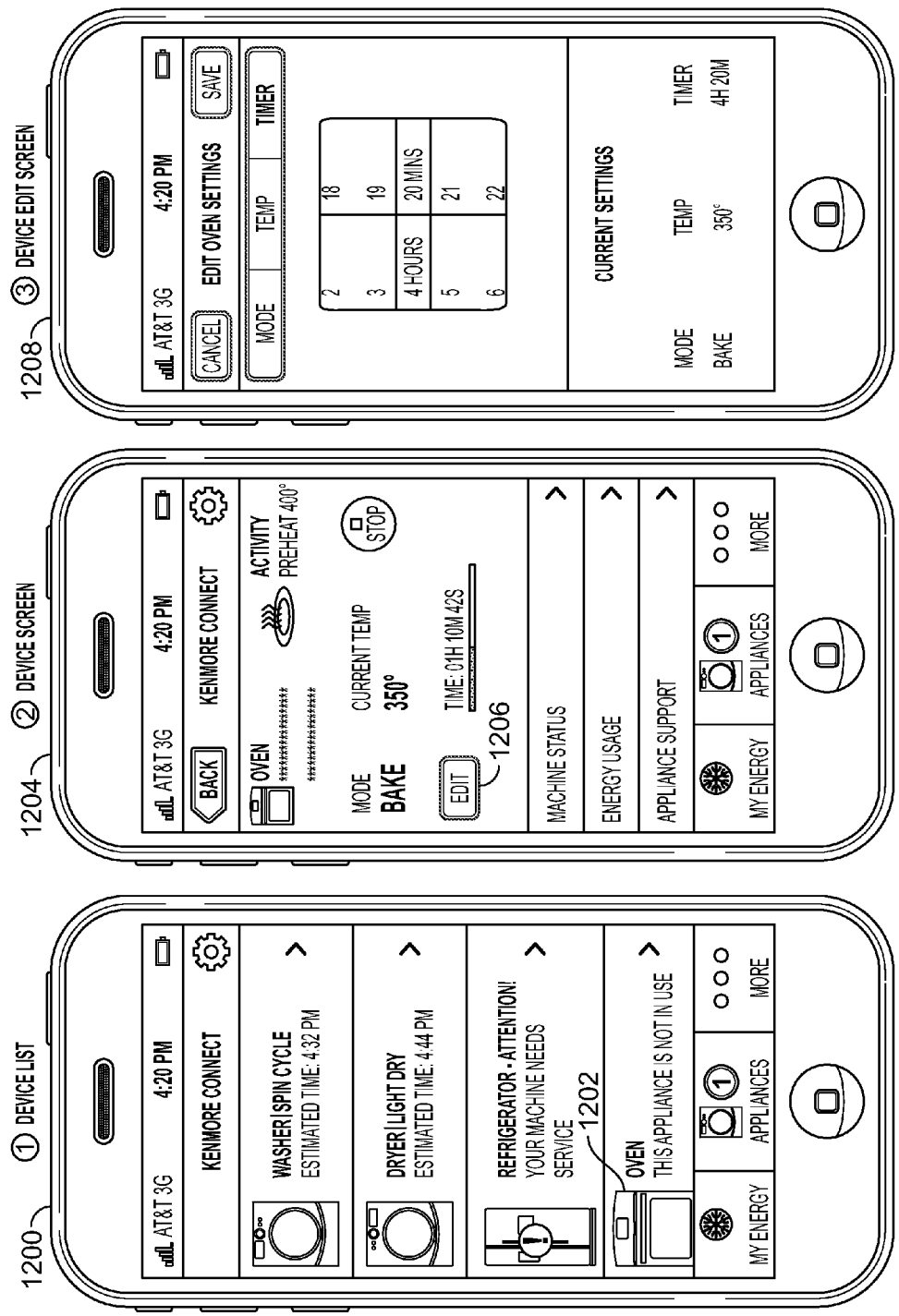
FIG. 12 is a graphical representation of mobile device list, mobile individual device, and mobile individual device edit screen layouts/dashboards that presents networked home appliance information to a consumer.

FIG. 12 illustrates several possible mobile device screen layouts/dashboards. In particular, FIG. 12 illustrates a mobile device list screen layout/dashboard 1200 that presents information to the consumer regarding the consumer's various networked home appliances, e.g., a washer, a dryer, a refrigerator, an oven. The consumer may select a particular networked appliance, such as an oven, by selecting the oven button 1202 from the mobile device list screen layout/dashboard 1200. After selecting the oven button 1202, the consumer is presented with mobile individual device screen layout/dashboard 1204, which presents information to the consumer regarding a particular networked home appliance, in this case, the oven. The information presented to the consumer on the mobile individual device screen layout/dashboard 1204 will depend on the individual networked home appliance featured on the mobile individual device screen layout/dashboard 1204 at any given time. The consumer may wish to remotely set the oven mode, temperature, or cook time by selecting the edit button 1206. After selecting the oven button 1206, the consumer is presented with mobile individual device edit screen layout/dashboard 1208 that allows the consumer to edit particular parameters of the oven, including oven mode, temperature, and cook time. The information presented to the consumer on the mobile individual device edit screen layout/dashboard 1208 will depend on the individual networked home appliance featured on the mobile individual device edit screen layout/dashboard 1208 at any given time.

Figure 13:
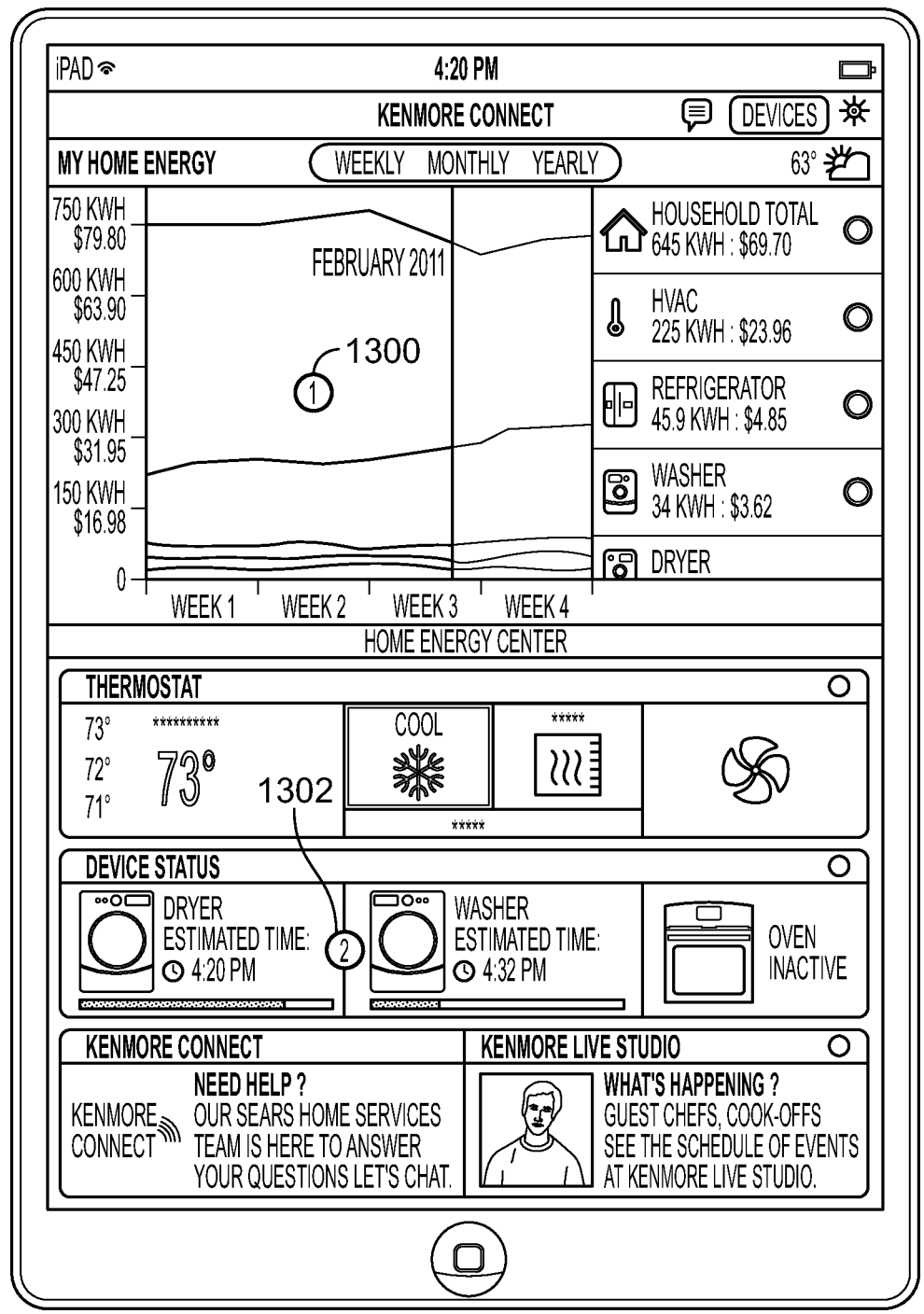
FIG. 13 identifies and describes several possible animation cues that may be incorporated into the subject system.

Some of the screen layouts/dashboards may use animations to present information to the consumer, such as those described in FIG. 13. In particular, the consumer's home energy graph 1300 might dynamically animate up from the bottom of the graph. Further, the washer appliance device icon 1302 might animate differently according to its current wash cycle, e.g., if the washer appliance is in its wash cycle, then the device icon might show bubbles. There are many other possible animations that the various screen layouts/dashboards might incorporate to enhance user experience.

Figure 14:
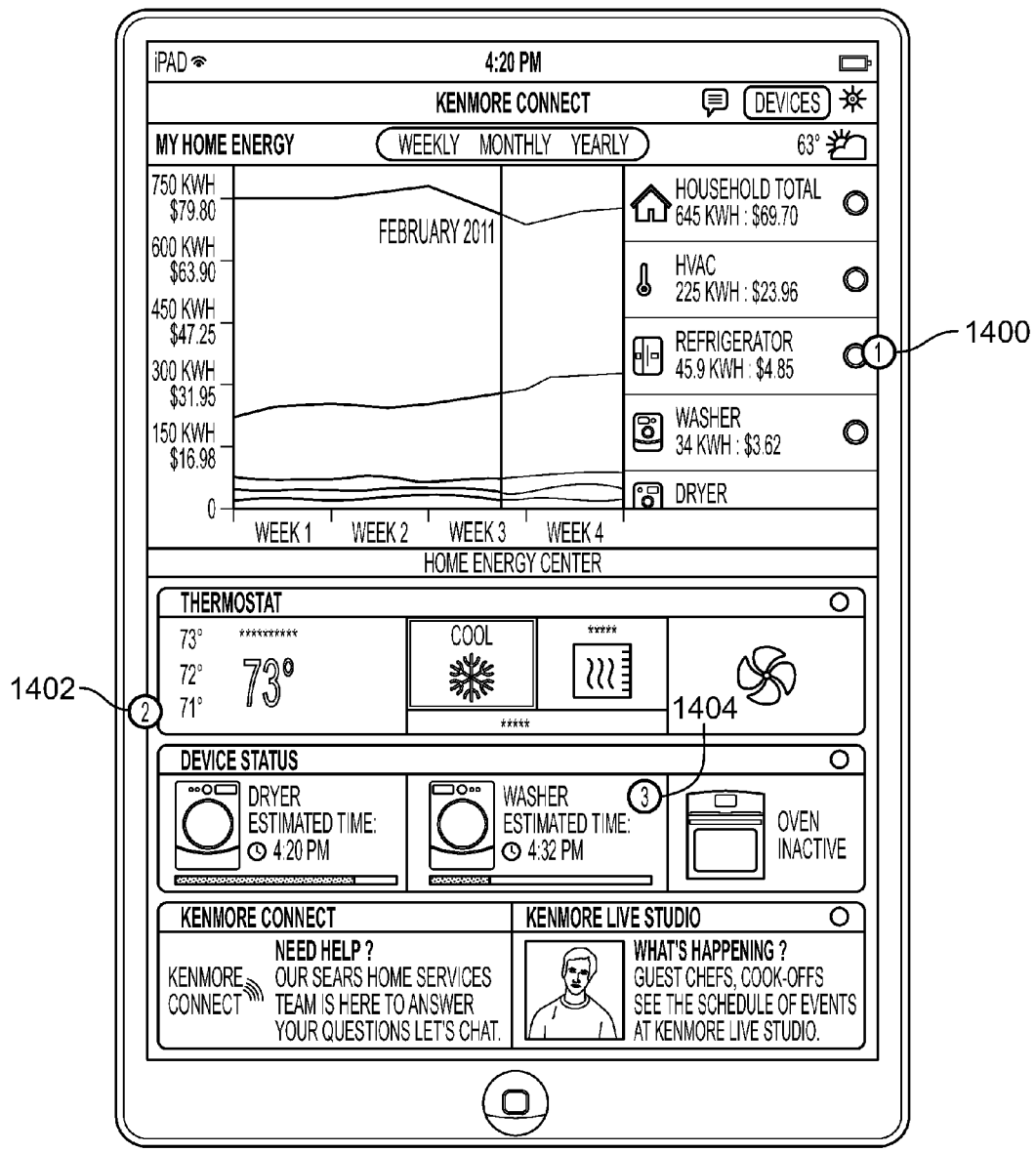
FIG. 14 identifies and describes several possible sound cues that may be incorporated into the subject system.

Some of the screen layouts/dashboards may use sound cues to present information to the consumer, such as those described in FIG. 14. In particular, if a particular networked appliance, such as a refrigerator, requires the consumer to attend to it for any number of reasons (e.g., the door is ajar, the temperature is too high or too low, etc.), or if there is new information regarding the refrigerator, perhaps relating to its energy consumption, that might be of interest to the consumer, the application might emit a sound cue, inviting the consumer to select the refrigerator energy consumption button 1400 so that such information is presented to the consumer. Further, the application might emit sound cues to provide feedback to the consumer when the consumer engages in gestural interactions with the application, such as when operating the thermostat temperature scroll 1402. Also, if a particular networked device malfunctions, the application might emit a cue that alerts the consumer to select a particular device icon, such the washer device icon 1404, so that the application can present the consumer with information related to the device malfunction. An alert icon might also appear on or near the relevant malfunctioning device icon to further indicate to the user that a malfunction has occurred. There are many other possible sound cues that the various screen layouts/dashboards might incorporate to enhance user experience.

Figure 15:
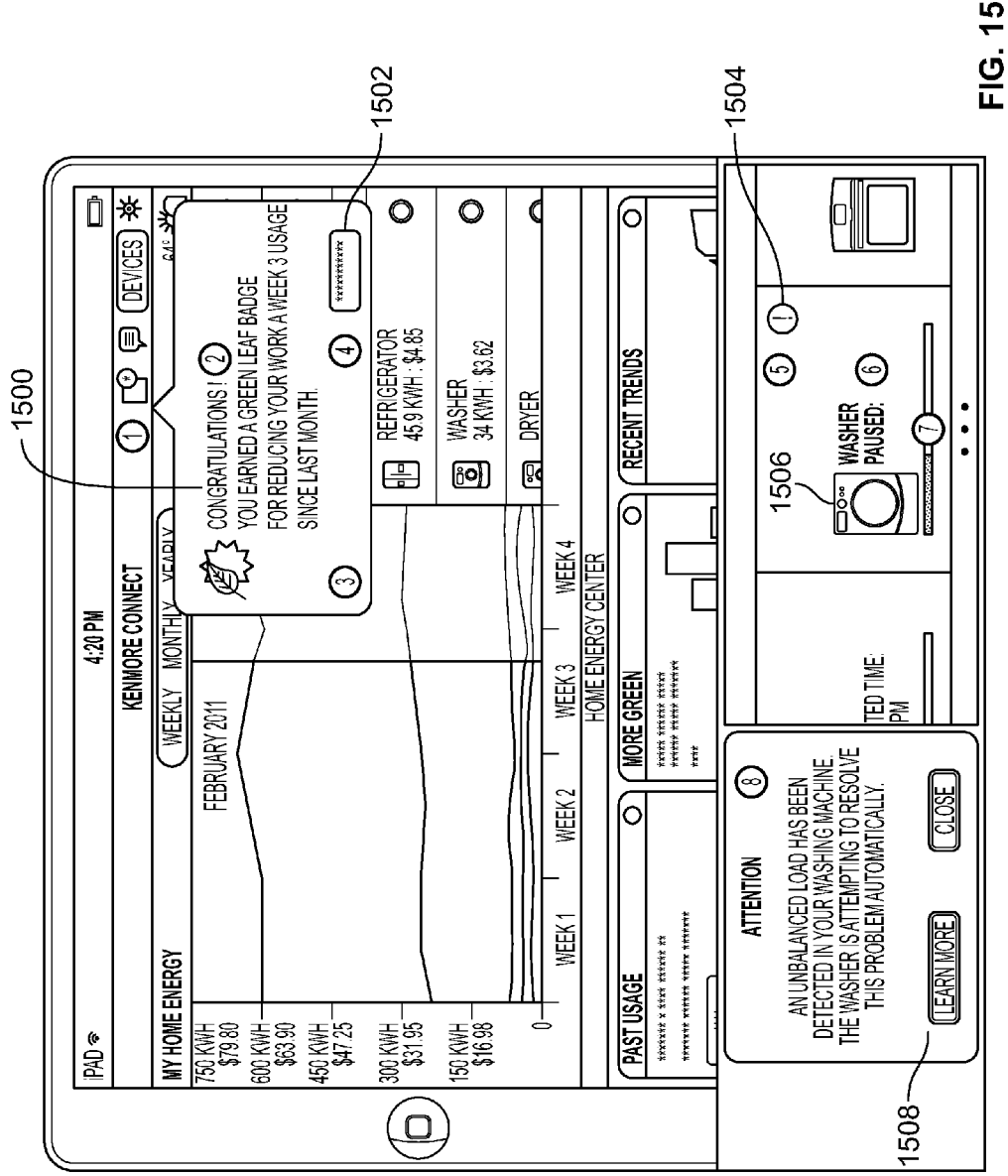
FIG. 15 is a graphical representation of several possible notifications relating to a networked home appliance that a consumer might encounter when using a tablet device.

Some of the screen layouts/dashboards might incorporate notifications, such as those depicted in FIG. 15. One example of a possible notification that the consumer might receive is a badge notification 1500 earned via use of the consumer's appliance. The consumer may "share" its badge notification 1500 with others on a social network, such as, for example, Shop Your Way Rewards, by selecting a share button 1502 appearing on or near the badge notification 1500. Screen layout/dashboard notifications might take the form of an alert icon 1504. The alert icon 1504 might appear on or near a networked appliance device icon, such as a washer device icon 1506. Upon selecting on or near the alert icon 1504 or washer device icon 1506, the consumer might receive an alert pop up 1508 that presents information to the consumer regarding the particular networked appliance that is the subject of the alert. For example, the alert pop up 1508 might inform the consumer that an unbalanced washing machine load has been detected in the networked washer appliance. Screen layouts/dashboards may incorporate notifications of a variety of formats, fonts, colors, styles, and no particular notification format, font, color or style is required to be within the spirit of the invention.

Figure 16B:
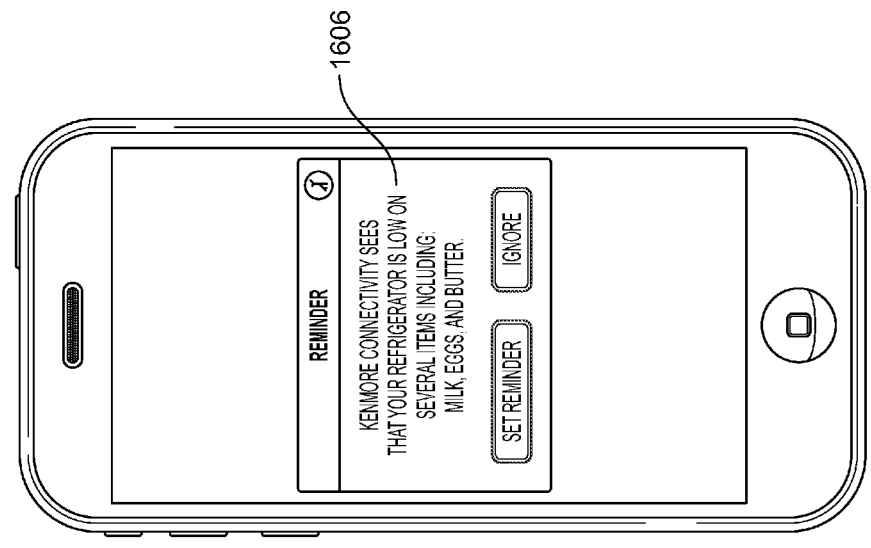
FIG. 16 is a graphical representation of several possible notifications relating to a networked home appliance that a consumer might encounter when using a mobile device.
Figure 16A:
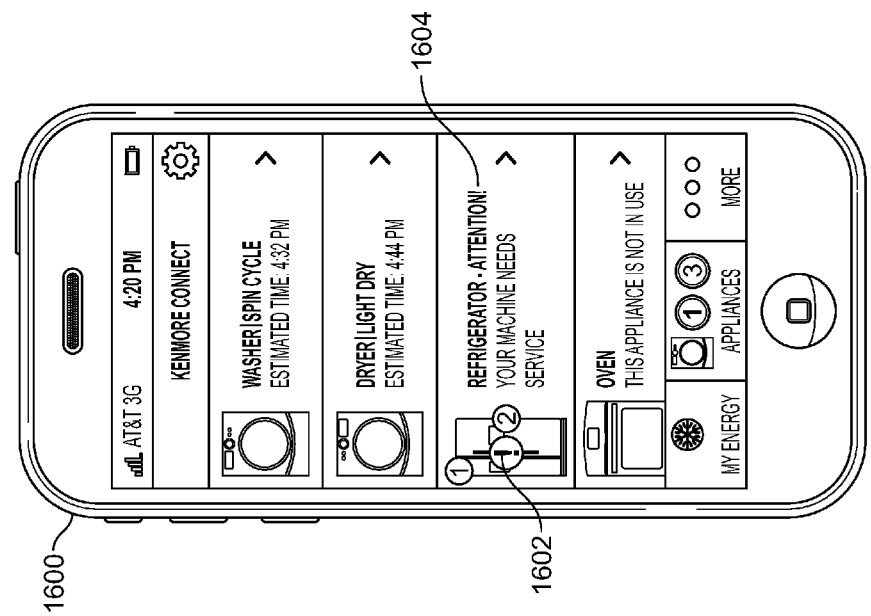

Some of the screen layouts/dashboards displayed in a mobile application may incorporate notifications, such as those illustrated in FIG. 16. The mobile application might display a notification alert 1600 to indicate to the consumer to access the relevant screen layout/dashboard, e.g., the appliances screen, to learn more about the notification alert 1600. Once the mobile application is displaying the relevant screen, an alert icon 1602 may appear on or near the relevant device to which the notification pertains, in this embodiment, the refrigerator. As a further indication to the consumer that the notification pertains to a particular device, the mobile application may alter the screen layout's/dashboard's appearance by, for example, altering the opacity, color, style or format of the device icon 1604. Upon selecting the alert icon 1602, the consumer might receive an alert pop up 1606 that presents information to the consumer regarding the particular networked appliance.

Figure 17A:
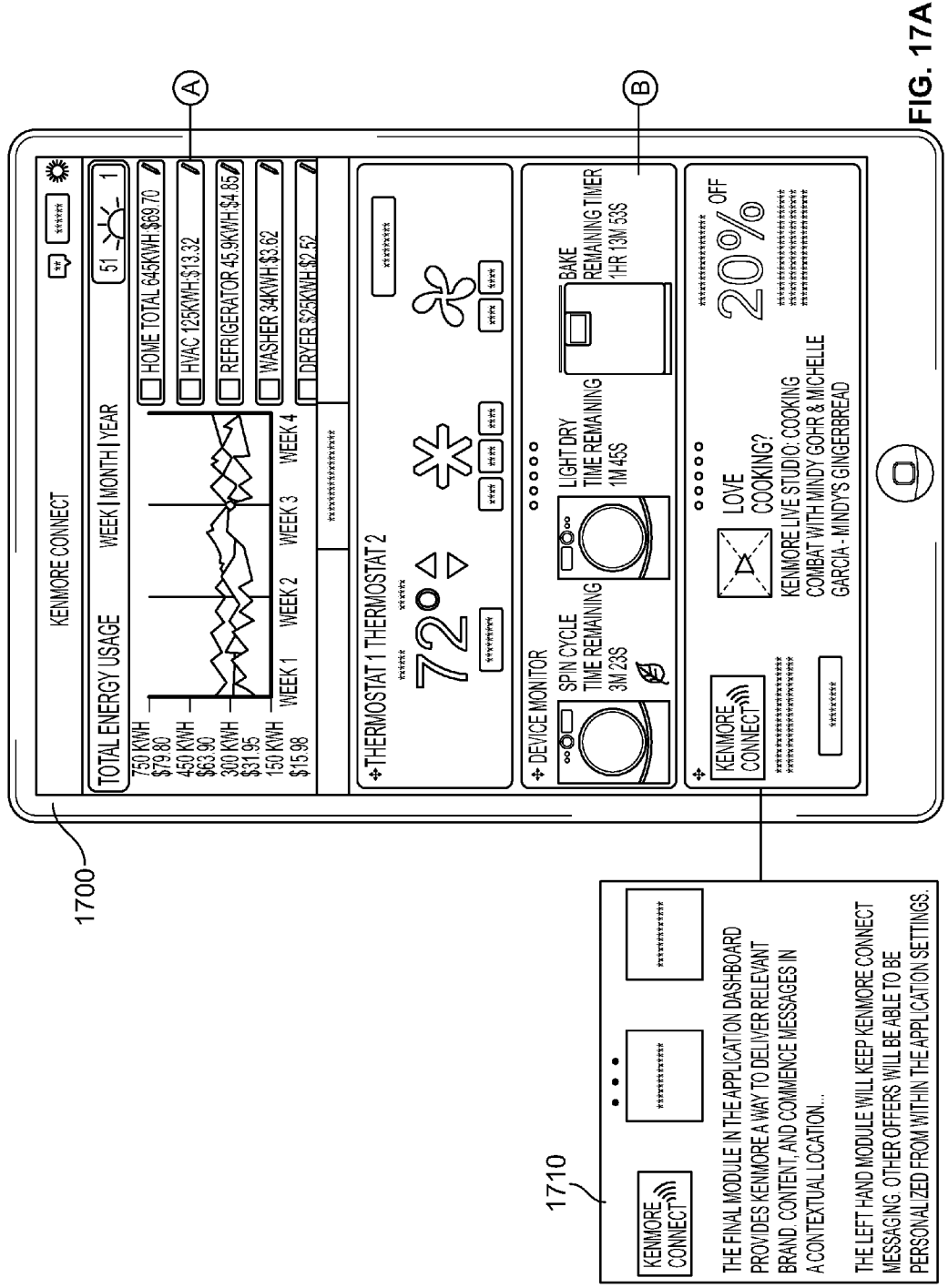
FIG. 17 is a graphical representation of a portrait-oriented tablet device showing one possible screen layout/dashboard that presents networked home appliance information to a consumer and several possible gestural interactions that a consumer can use to manipulate the presented information.
Figure 17B:
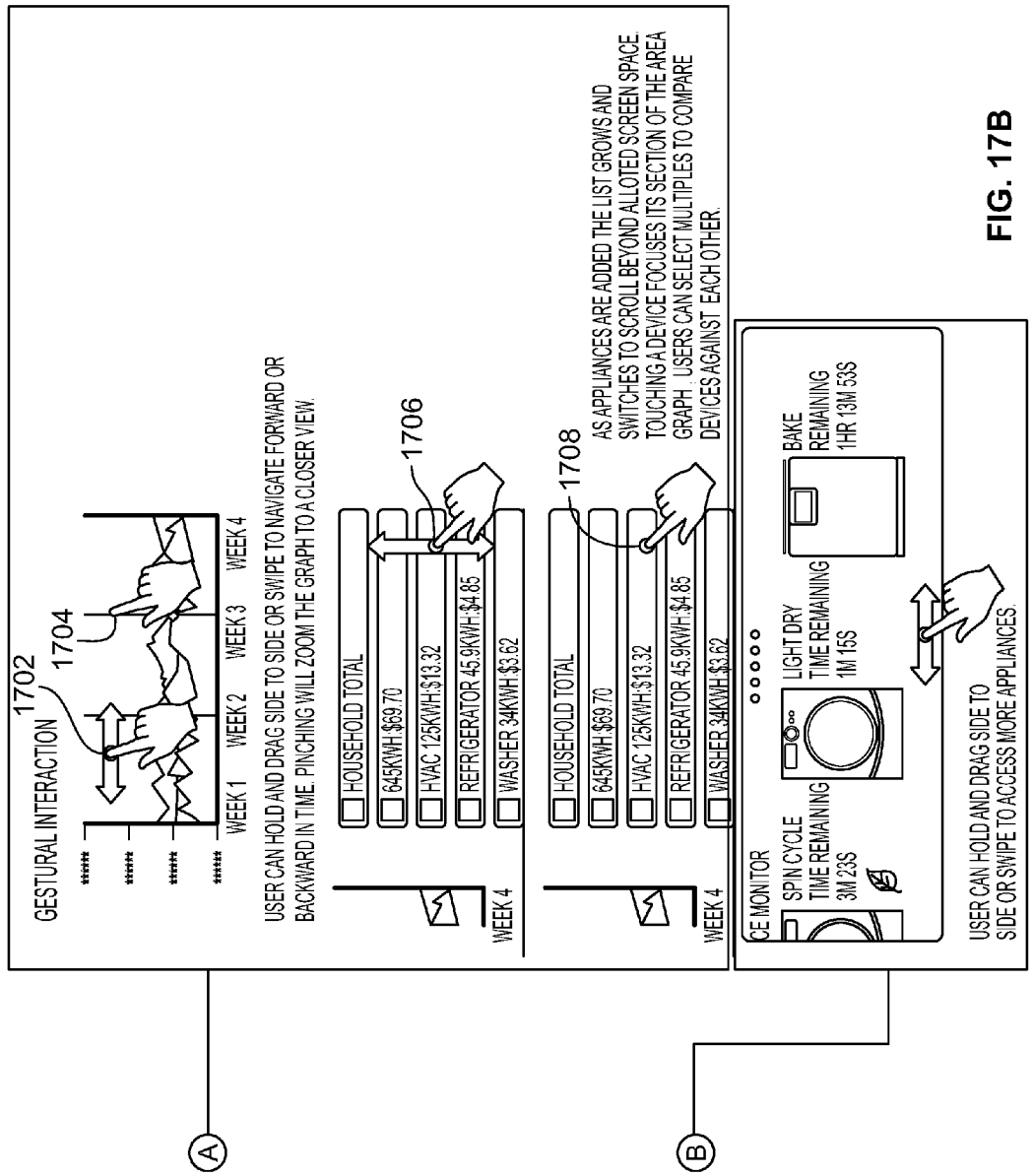
Figure 18:
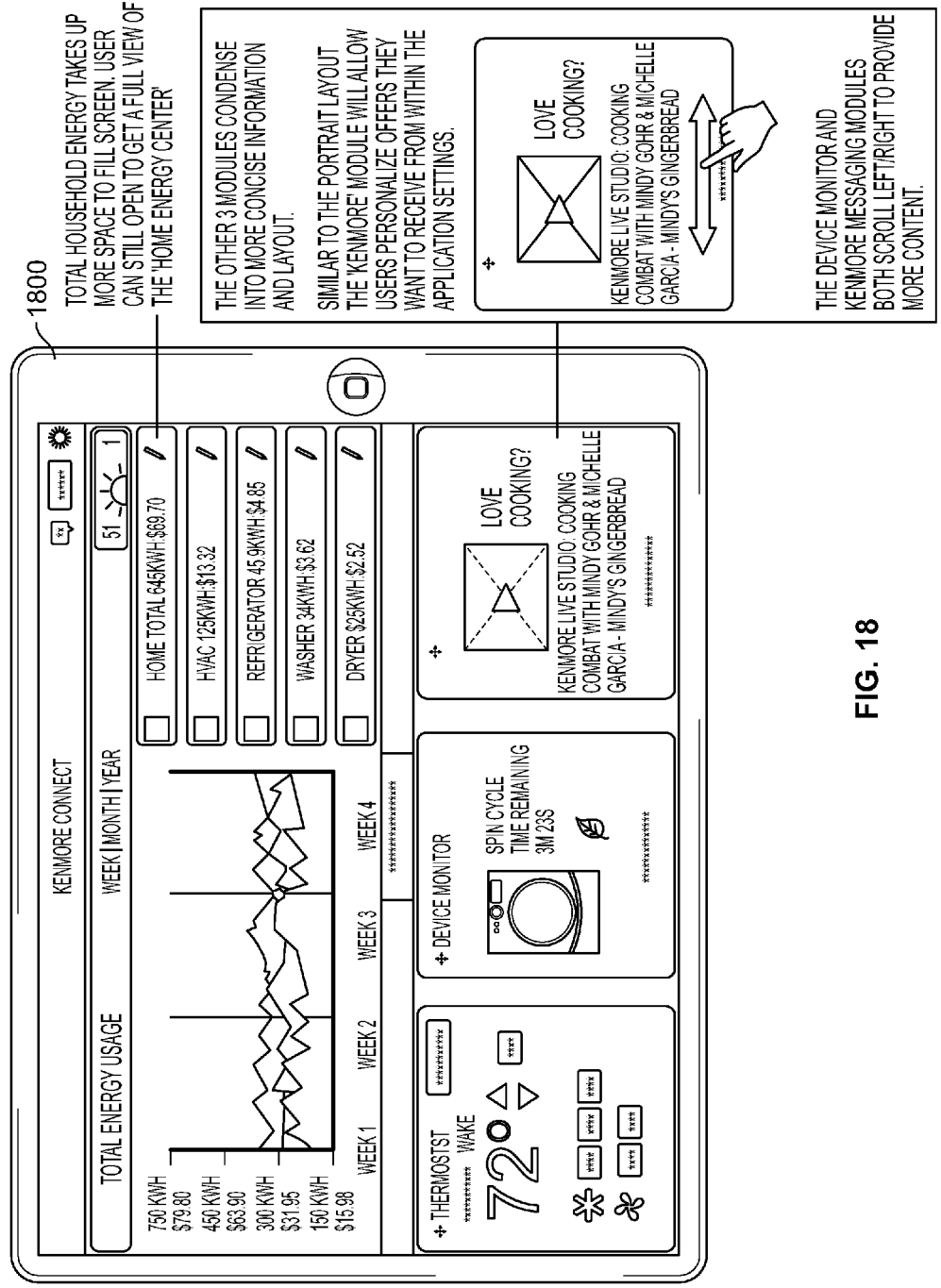
FIG. 18 is a graphical representation of a landscape-oriented tablet device showing one possible screen layout/dashboard that presents networked home appliance information to a consumer and several possible gestural interactions that a consumer can use to manipulate the presented information.

FIG. 17 illustrates an alternative screen layout/dashboard 1700 and describes various gestural interactions that the consumer might use to manipulate the information presented in screen layout/dashboard 1700. For example, the consumer can hold and drag side to side 1702, swipe 1704, hold and drag up and down 1706, and/or touch 1708 to manipulate the information presented on the screen layout/dashboard 1700. There are many other types of gestural interactions that the consumer could employ the manipulate the data presented on the screen layout/dashboard 1700. The screen layout/dashboard 1700 depicted in FIG. 17 contains a module 1710 that allows a third party to deliver messages that might be of interest to the user. Such messages might contain relevant commercial offers or brand information. The messages received by a user might be specifically tailored to the user, based on the user's demographic information, network appliance identity and usage, and other system settings. While the screen layout/dashboard might be portrait-oriented such as screen layout/dashboard 1700, as shown in FIG. 17, in the alternative, the screen layout/dashboard might be landscape-oriented, such as screen layout/dashboard 1800, as shown in FIG. 18 or oriented differently.

Figure 19:
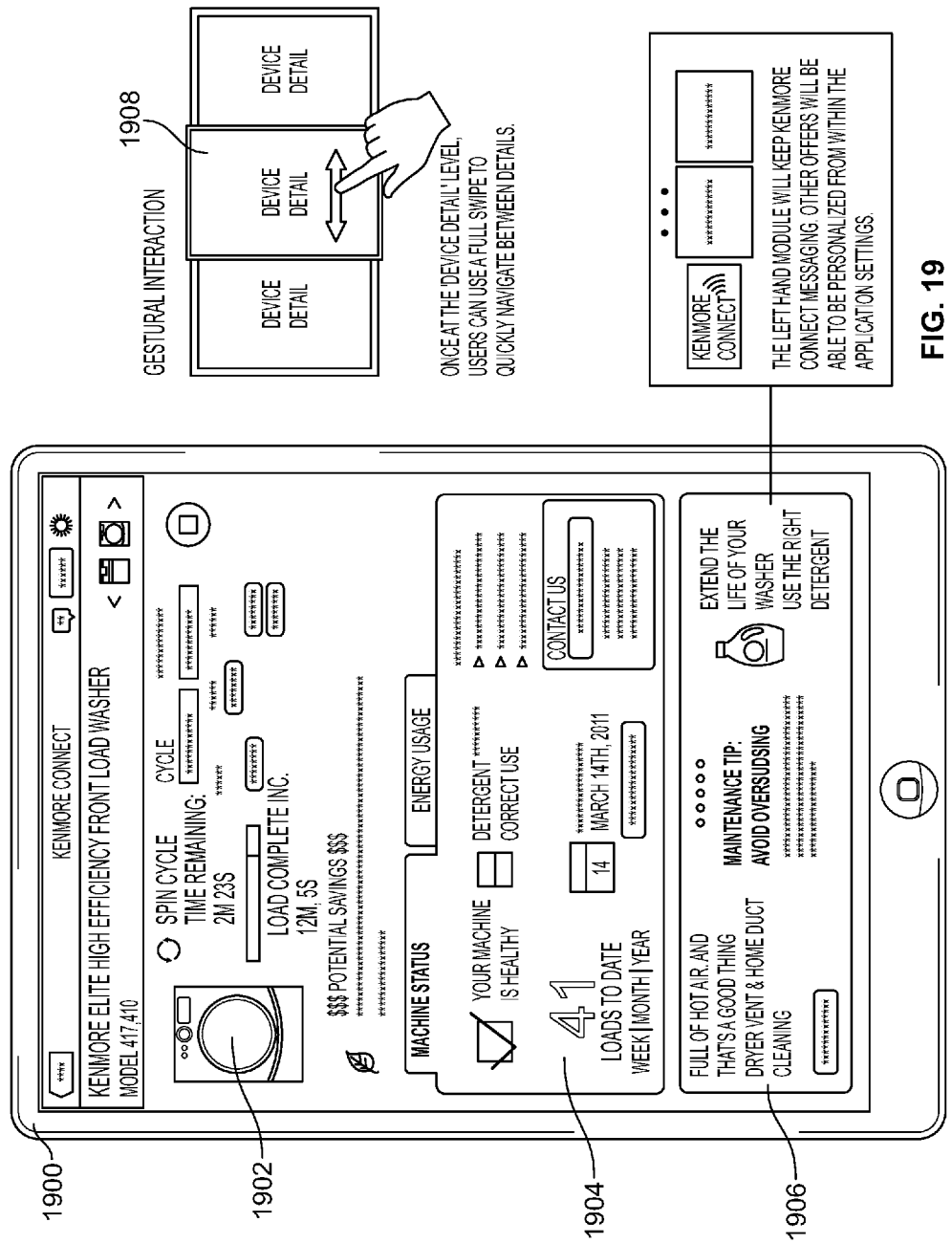
FIG. 19 is a graphical representation of a tablet device showing one possible screen layout/dashboard that presents a consumer with detailed information regarding a particular networked appliance and an integrated shopping module through which a consumer may receive relevant commercial offers or information.
Figure 20:
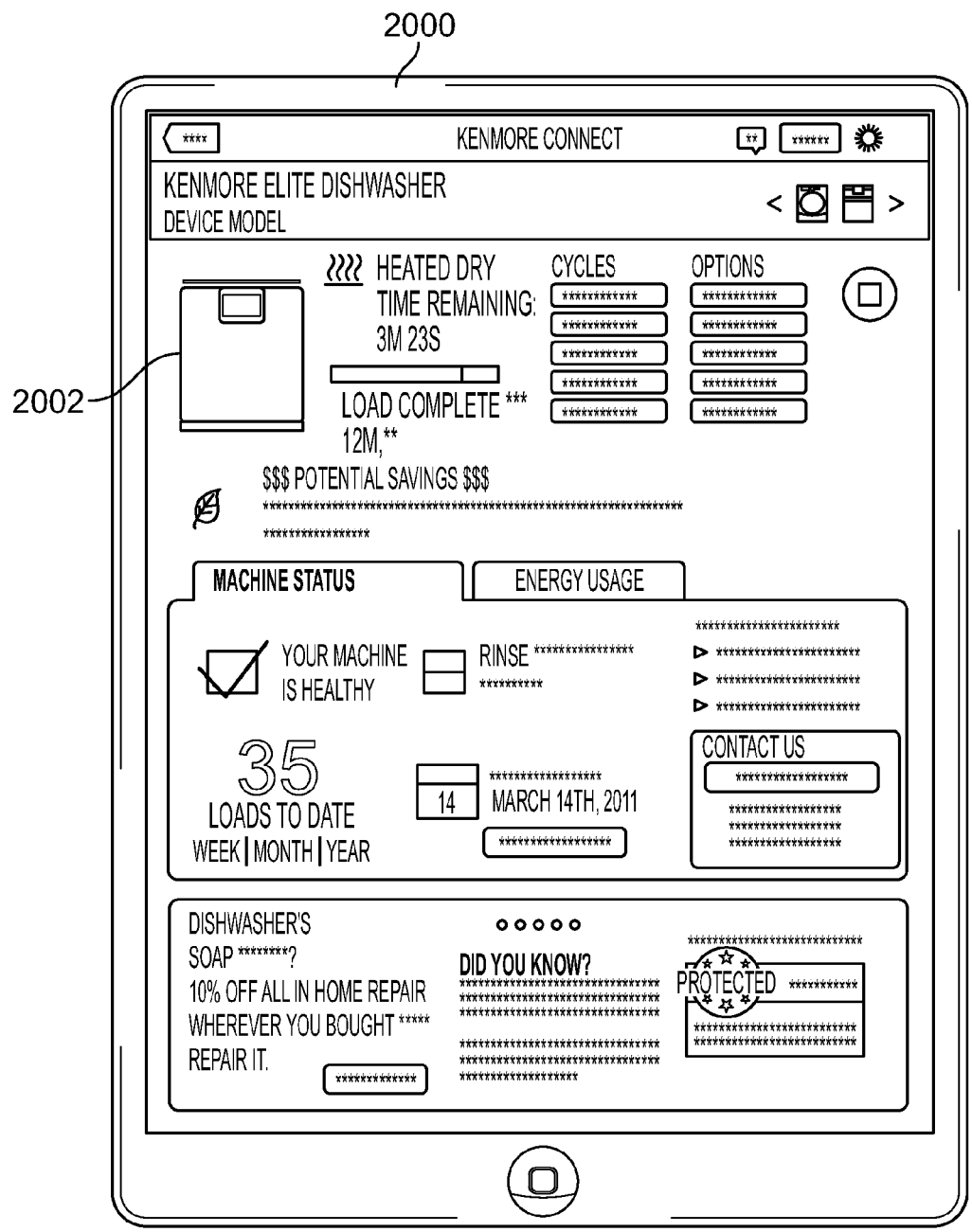
FIG. 20 is a graphical representation of a tablet device showing one possible screen layout/dashboard that presents a consumer with detailed information regarding a particular networked appliance, in this case, a dishwasher.

FIG. 19 depicts a possible tablet screen layout/dashboard 1900. This tablet screen layout/dashboard 1900 presents the consumer with detailed information regarding a particular networked appliance, such as washer 1902. Such detailed information might include machine status and energy usage information 1904. Also, the tablet screen layout/dashboard

1906 might contain an integrated shopping module 1906 that allows a third party to deliver messages that might be of interest to the consumer. The integrated shopping module 1906 might contain relevant commercial offers or brand information. The messages received by a user might be specifically tailored to the user, based on the user's demographic information, network appliance identity and usage, and other system settings. The tablet screen layout/dashboard 1900 permits the user to use a swipe gestural interaction 1908 to navigate between the various networked appliances. The user might use a swipe gestural interaction 1908 to navigate to a dishwasher screen layout/dashboard 2000, such as that shown in FIG. 20. While the dishwasher screen layout/dashboard 2000 might display some of the same types of information that the tablet screen layout/dashboard 1900 presented to the consumer, it might also display dishwasher specific information, such as a soil sensor detector or a load status indicator 2002.

Figure 21:
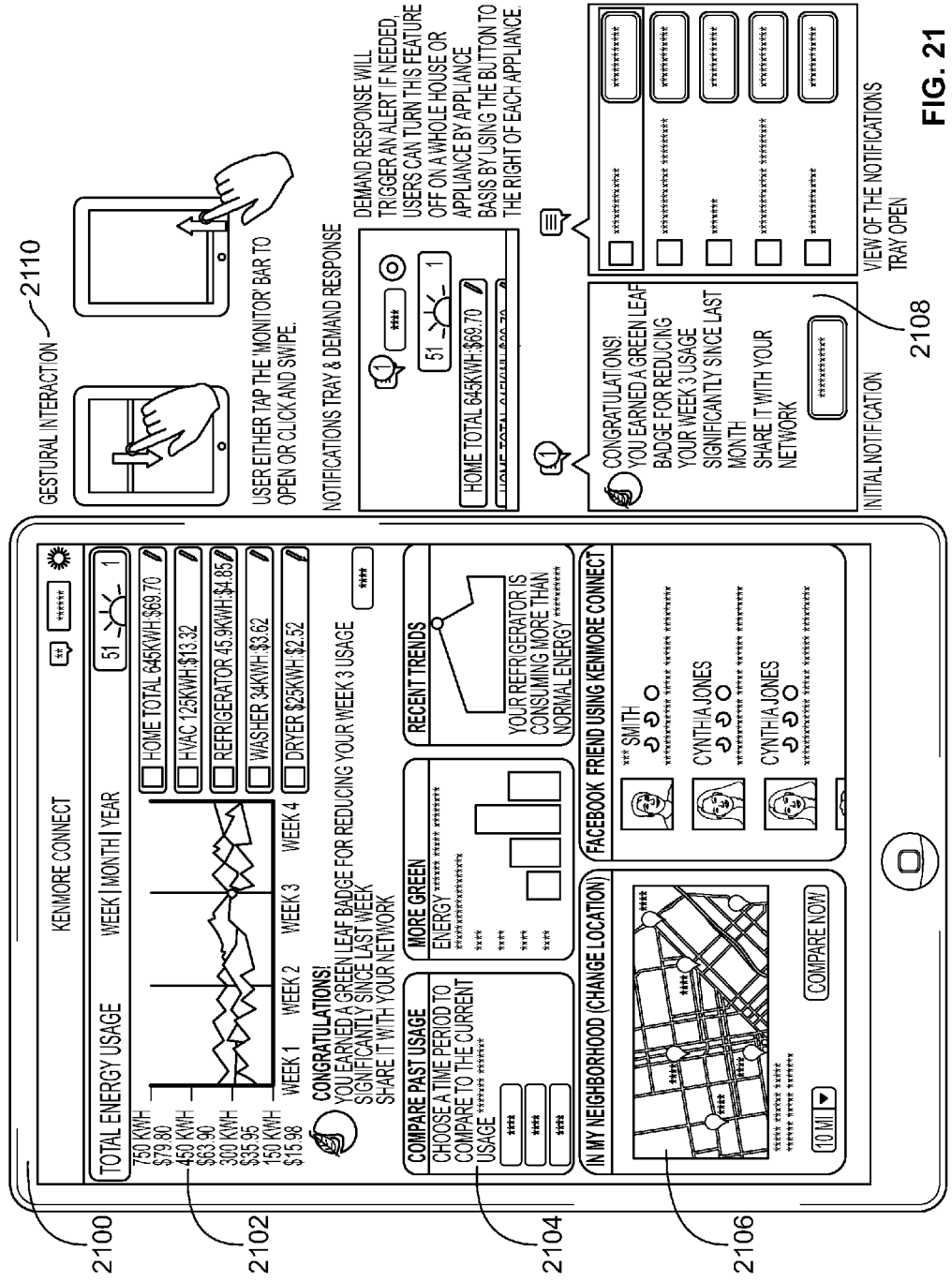
FIG. 21 is a graphical representation showing one possible screen layout/dashboard that presents a consumer with detailed information regarding a particular networked appliance's energy consumption data and savings as well as several possible gestural interactions that a consumer might use to manipulate the presented data.
Figure 22:
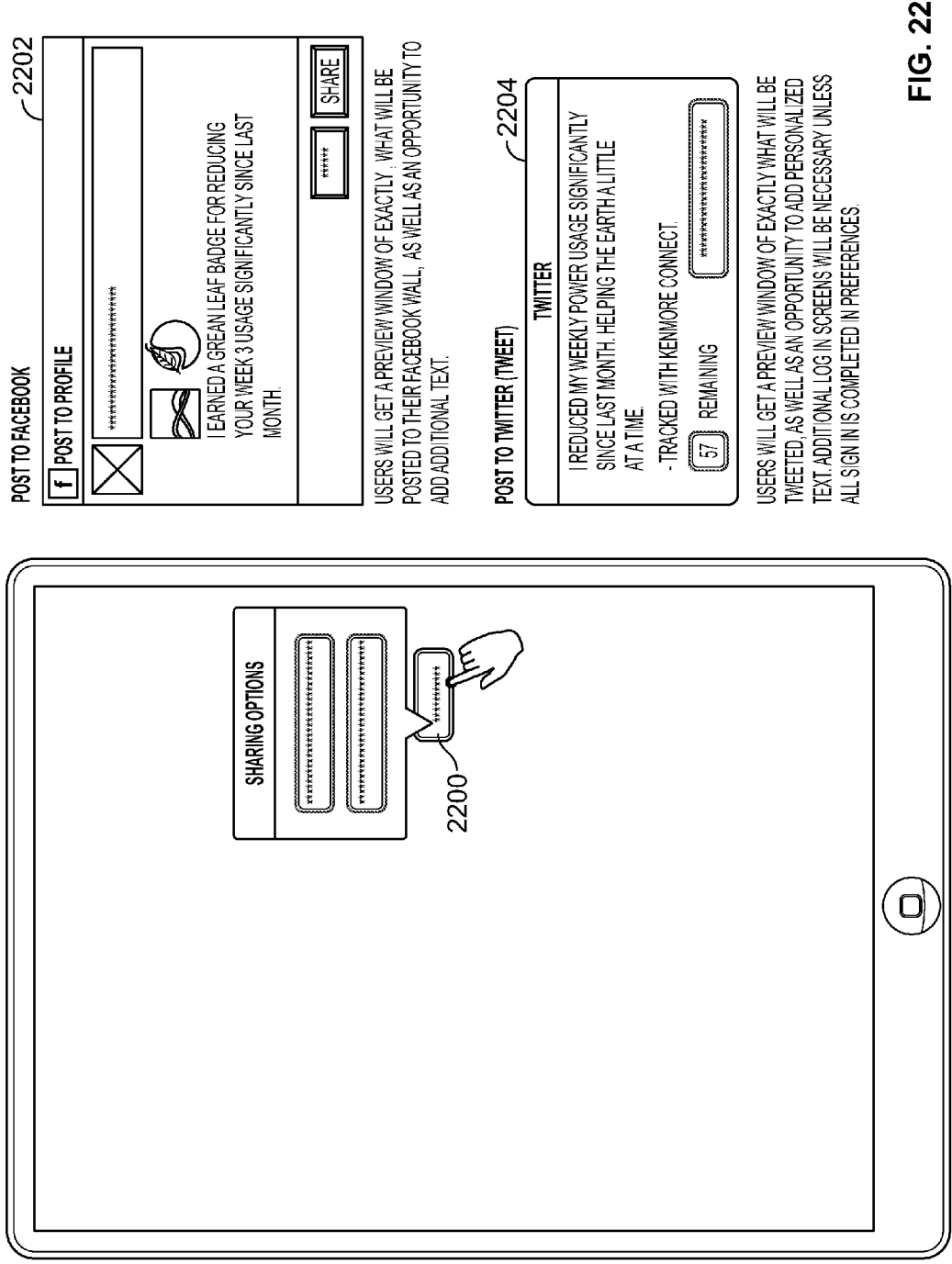
FIG. 22 is a graphical representation showing one possible screen layout/dashboard that presents a consumer with an opportunity to share via social network detailed information regarding a particular networked appliance.

FIG. 21 illustrates a tablet-based application 2100 by which the consumer can view its home energy consumption data and savings. This tablet-based application 2100 presents current total energy usage data 2102, past energy usage data 2104, and/or community energy usage data 2106 for comparison purposes. Other features of this tablet-based application 2100 include the use of notifications 2108 to provide information to the consumer. Such notifications 2108 might relate to badges earned by the consumer. The consumer can manipulate the information presented in the tablet-based application 2100 by using various gestural interactions 2110, such as a tap or a click and swipe. The tablet-based application 2100 may incorporate social networking features, such as those depicted in FIG. 22. For example, when the consumer selects the share it button 2200, the consumer is presented with the option of posting energy usage data to Facebook and/or Twitter. If the consumer chooses to post energy usage data to Facebook, the consumer will be presented with a preview 2202 of what will appear on the consumer's Facebook webpage. If the consumer chooses to post energy usage data to Twitter, the consumer will be presented with a preview 2204 of what will appear on the consumer's Twitter webpage.

Figure 23:
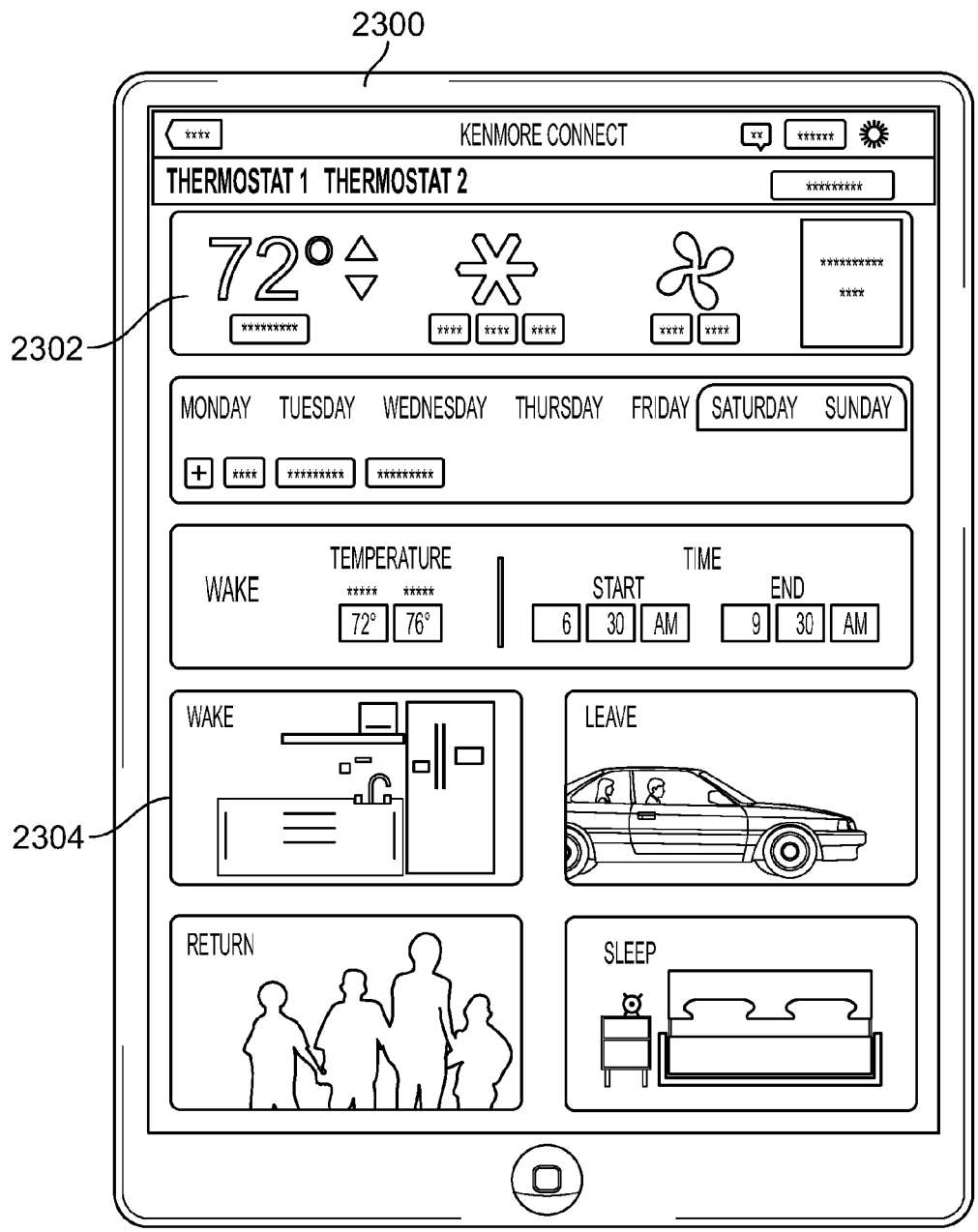
FIG. 23 is a graphical representation of a tablet-based thermostat application that presents a consumer with detailed thermostat information.

FIG. 23 illustrates a tablet-based thermostat application 2300 by which the consumer can view thermostat information. The tablet-based thermostat application 2300 has a temperature setting feature 2302 that allows the consumer to both view and edit the current thermostat temperature settings. In particular, this temperature setting feature 2302 allows the consumer to control whether to turn on/off the heat, air conditioning, and fan through the tablet-based thermostat application 2300. Moreover, the tablet-based thermostat application 2300 permits the consumer to identify and set temporal thermostat configurations 2304. Such temporal thermostat configurations 2304 might be tied to daily events, such as waking up, leaving home, returning home, and/or going to sleep.

Figure 24:
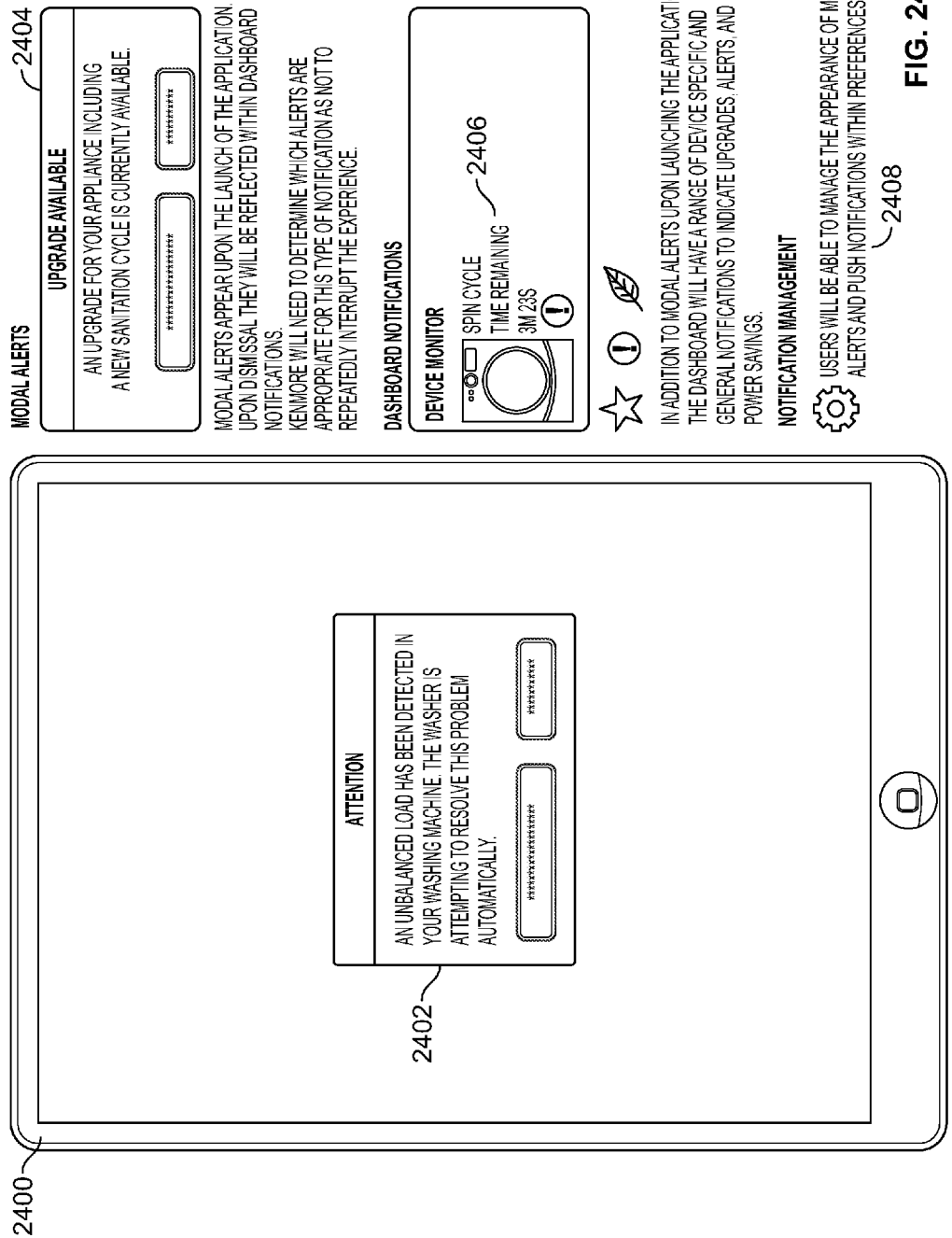
FIG. 24 is a graphical representation of a tablet or mobile device showing several possible alerts and notifications that might be presented to a consumer regarding a networked appliance.

FIG. 24 illustrates a tablet or mobile-based diagnostic alert application 2400 by which the consumer might receive diagnostic alerts relating to one or more of the consumer's networked appliances. For example, the consumer might receive an alert pop up 2402 if one of the consumer's networked appliances encounters a malfunction or potential malfunction, e.g., if a washer appliance detects an unbalanced load. The consumer might receive an alert pop up 2404 if an upgrade becomes available for one of the consumer's networked appliances, e.g., if a new sanitation cycle becomes available for a dishwasher or washing machine. Further, the consumer might receive a notification 2406 to provide a status update for a particular networked appliance, e.g., to inform the consumer how much time is remaining for a dryer cycle. The consumer can adjust the appearance and frequency of alert pop ups 2402, 2404 and notification 2406 through an alert pop up and notification management system 2408.

Figure 25A:
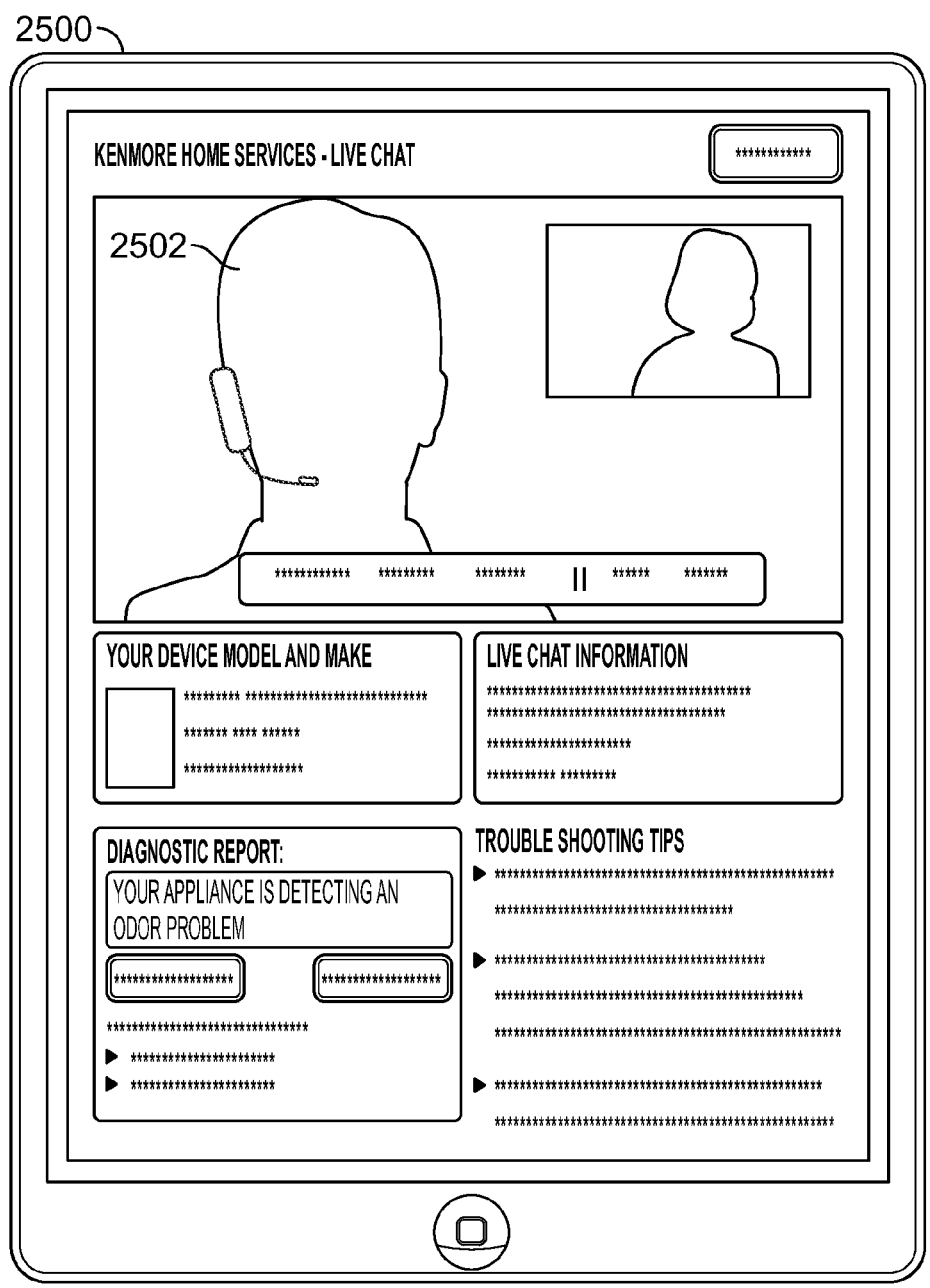
FIG. 25 is a graphical representation of a tablet or mobile device showing a live chat with service representative/technician.
Figure 25B:
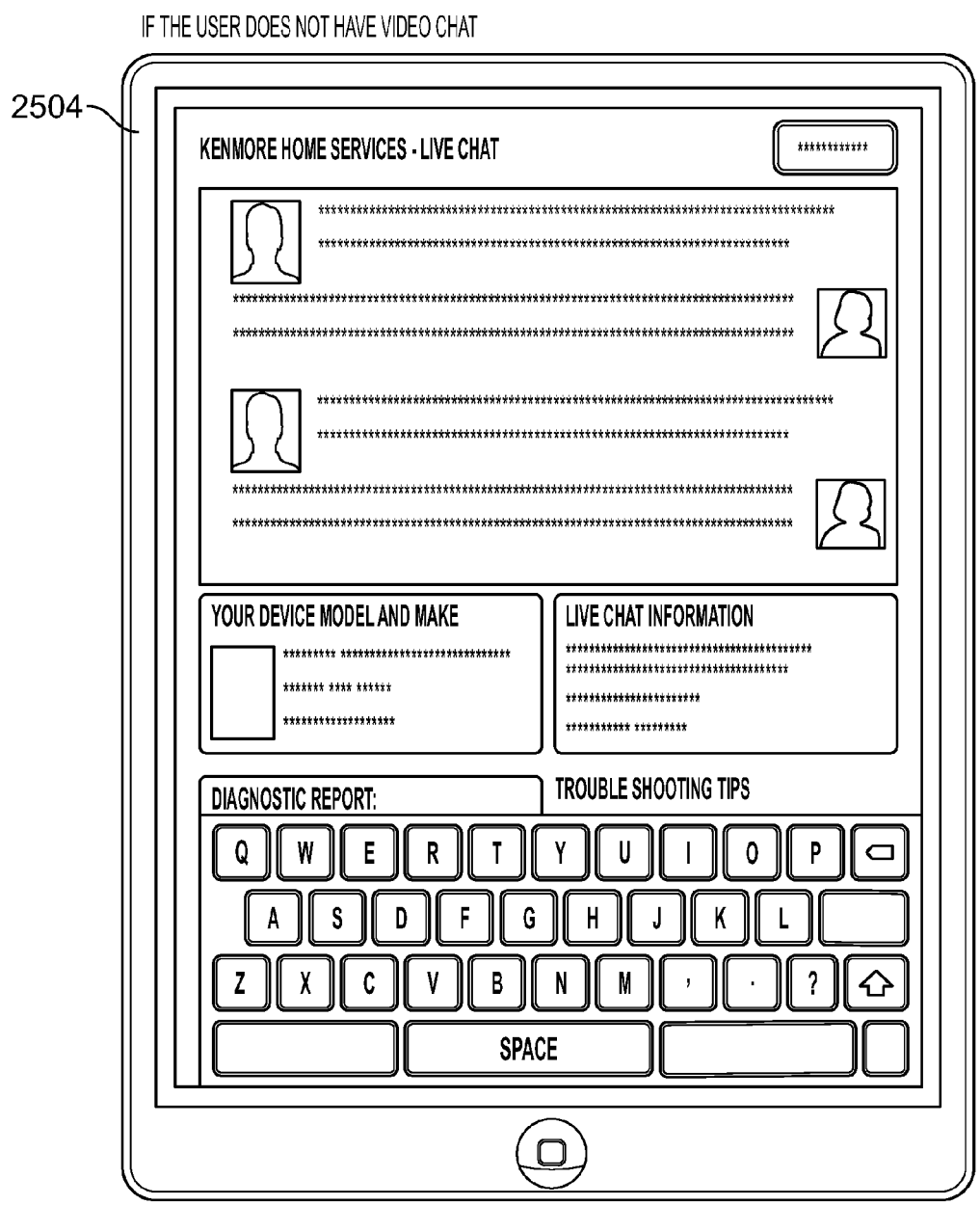

FIG. 25 illustrates an application 2500 by which the consumer may invoke a live chat with a service representative/technician 2502. In connection with this live video chat, the application 2500 would cause information related to the networked appliance, such as make, model, etc., and diagnostic information related to the operation of the appliance to also be uploaded to a server associated with the service representative/technician 2502. In this manner, the service representative/technician 2502 will have a base amount of information when conversing with the consumer. In the event that the platform being utilized by the consumer does not have video capabilities, the video chat may be replaced with a text or instant messaging chat 2504 as further illustrated.

FIG. 26 illustrates a mobile-based diagnostic alert application 2600 by which the consumer might receive diagnostic alerts relating to one or more of the consumer's networked appliances. For example, the consumer might receive an alert pop up 2602 if one of the consumer's networked appliances encounters a malfunction or potential malfunction. Further, the consumer might receive an alert pop up 2604 if one of the consumer's networked appliances, such as a refrigerator, needs servicing.

Furthermore, the subject system may function to recommend product to the consumer of an appliance 20 having a processing device 20 and at least one sensor 72 in communication with the processing device 20. To this end, the appliance 20 would gather, from the at least one sensor 72, data indicative of usage of a consumable with the appliance. The gathered data may then be used at the appliance 20 or at a remote server 68 to determine an amount of the consumable remaining. When the amount of the consumable remaining is at a predetermined level, e.g., the consumable will be exhausted within a given number of uses of the appliance 20 or within a given time period based on usage, the system may provide to the consumer a notification that the consumable needs to be replaced. In some circumstance, the system may automatically place an order for the consumable with a vendor for delivery to the consumer, for pick-up, etc.

The notification could also provide an incentive, for example in the form of a coupon, for the consumer to purchase a particular brand of the consumable. For measuring the usage of the consumable, an initial amount of the consumable may need to be provided to the system, e.g., the amount of consumable in the package when first opened. This initial amount of the consumable may be manually entered by the consumer or automatically determined using purchase information associated with the consumable. By way of example, the appliance 20 may be a washing machine and the consumable may be at least one of detergent, softener, and bleach, the appliance 20 may be a dish washer and the consumable may be at least one of detergent and a rinsing agent, the appliance 20 may be a dryer and the consumable may be a drying sheet or the like all without limitation.

Figure 27B:
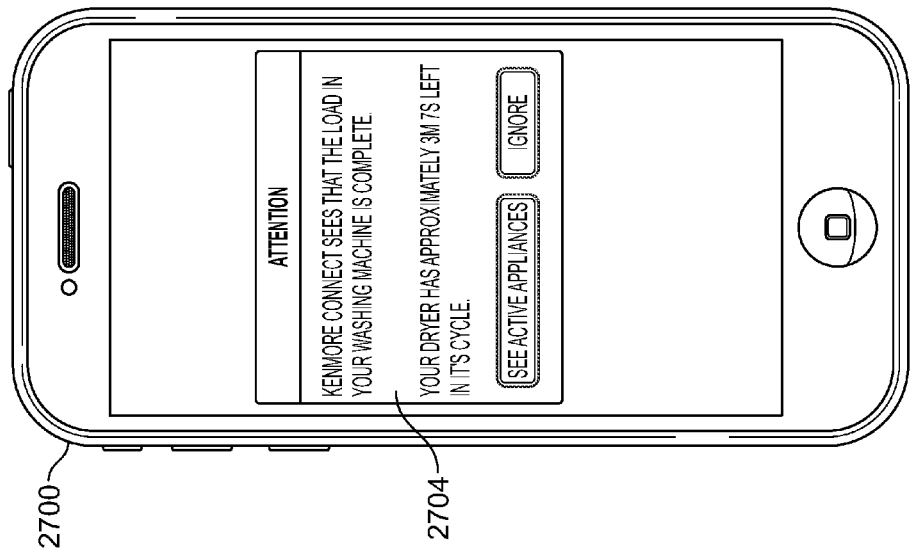
FIG. 27 is a graphical representation of a mobile device showing one possible screen layout/dashboard that presents a consumer with product purchase recommendations.
Figure 27A:
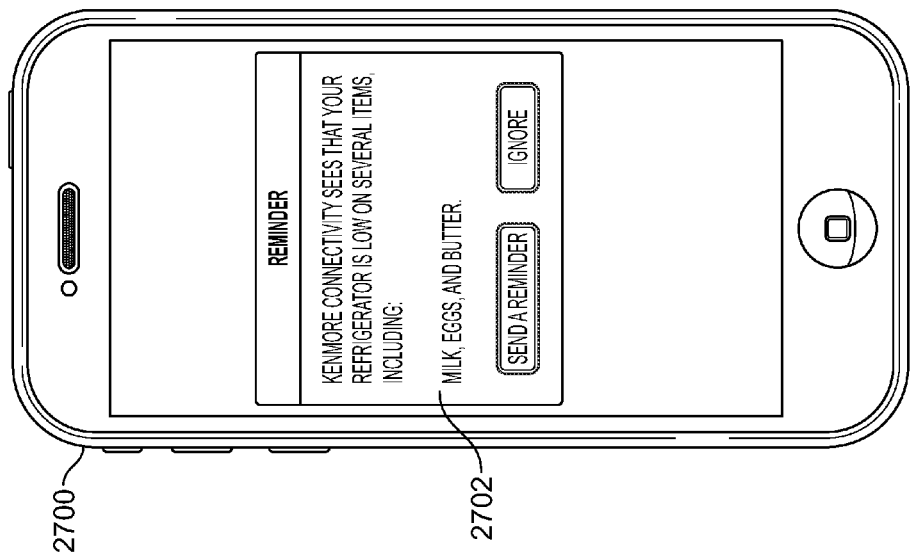

FIG. 27 illustrates an embodiment that discloses such a product recommendation function. In particular, FIG. 27 discloses a mobile-based reminder application 2700 by which the consumer might receive reminders relating to one or more of the consumer's networked appliances. For example, the mobile-based reminder application 2700 might receive a reminder pop up 2702, noting that the consumer's refrigerator is low on certain items and asking the consumer if it wishes to set a reminder to purchase those items. Alternatively, the reminder pop up 2702 might ask the consumer if it wishes to add those items to a shopping list. Further, the mobile-based reminder application 2700 might receive a reminder pop up 2704, noting that cycle status of the consumer's networked washing machine and dryer appliances. There are many other possible reminders associated with the invention not depicted in FIG. 26 or 27. It should be understood that a reminder/notification/alert may be implemented for any networked feature of an appliance.

Figure 28:
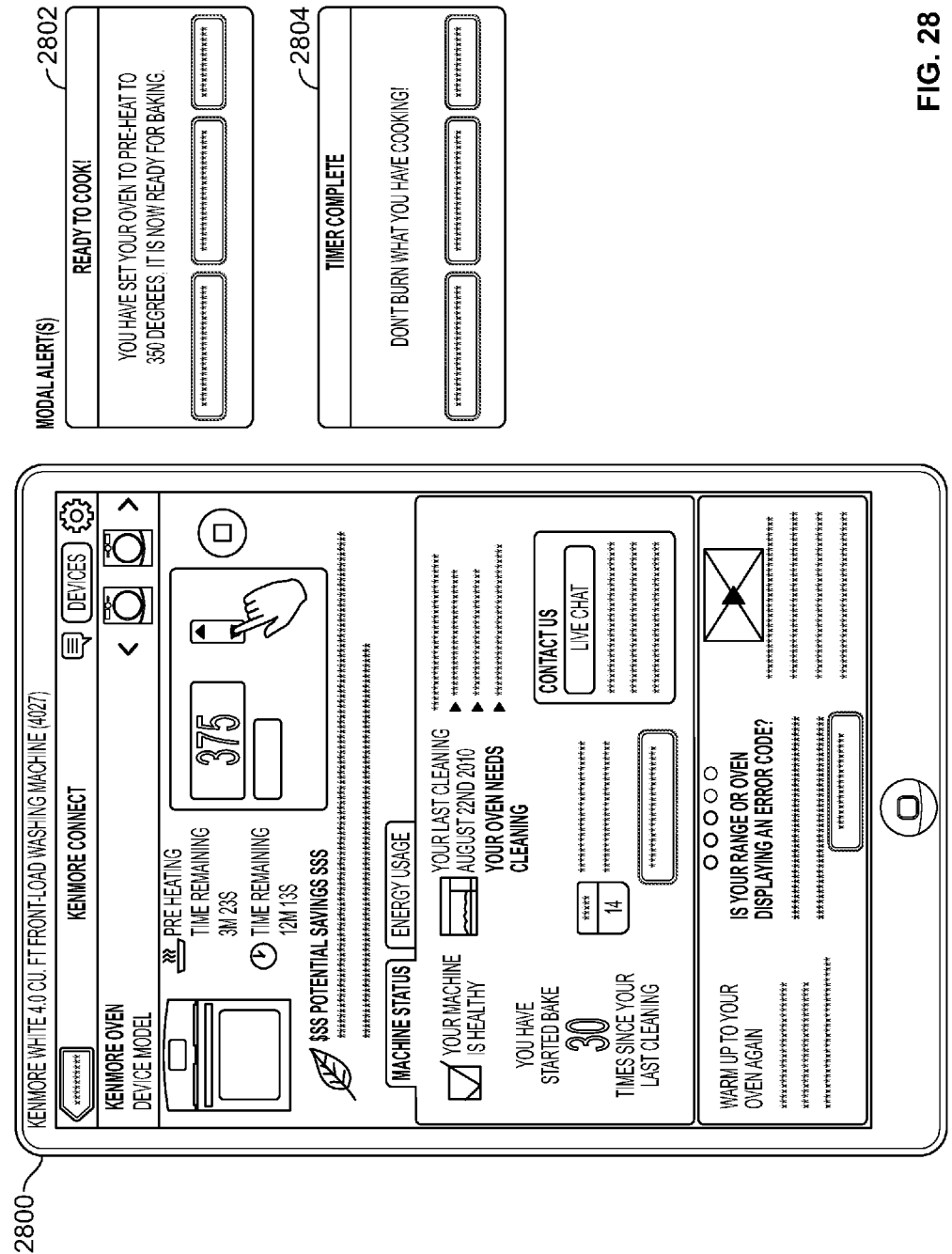
FIG. 28 is a graphical representation of a tablet device showing one possible screen layout/dashboard for a remote control application in which consumers can operate a networked appliance from a remote location.
Figure 29:
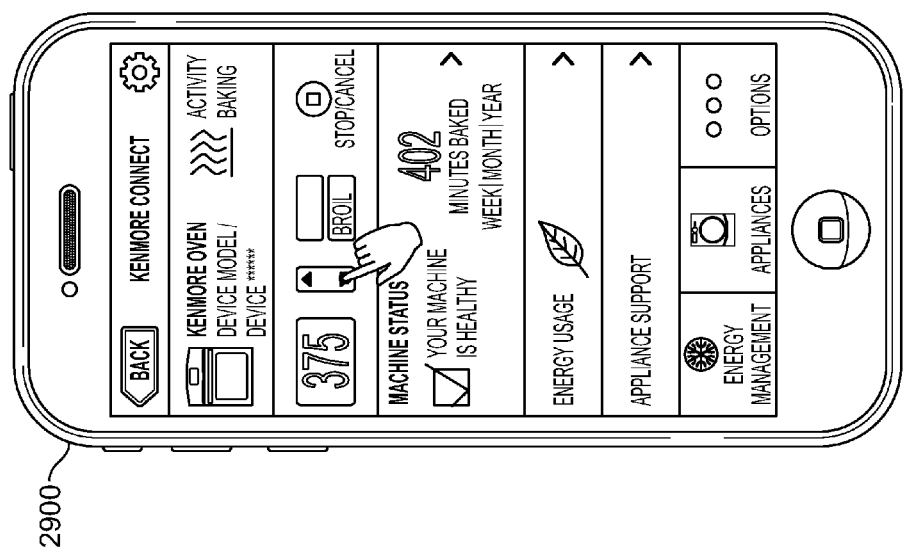
FIG. 29 is a graphical representation of a mobile device showing one possible screen layout/dashboard for a remote control application in which a consumer can operate a networked appliance from a remote location.

FIG. 28 illustrates a tablet-based remote control application 2800 by which consumers can remotely control various networked appliances. In particular, the consumer can preheat a networked oven appliance to a desired temperature using the tablet-based remote control application 2800. Once the networked oven appliance reaches the desired temperature, the tablet-based remote control application 2800 may display an alert 2802 to inform the consumer that the networked oven appliance has reached the desired temperature. The consumer may also remotely set an oven timer so as to properly cook the food (based on the cooking time). The tablet-based remote control application 2800 may display an alert 2804 to inform the consumer that the networked oven appliance timer has reached zero. Similar features are available on a mobile remote control application 2900, as shown in FIG. 29.

Figure 30:
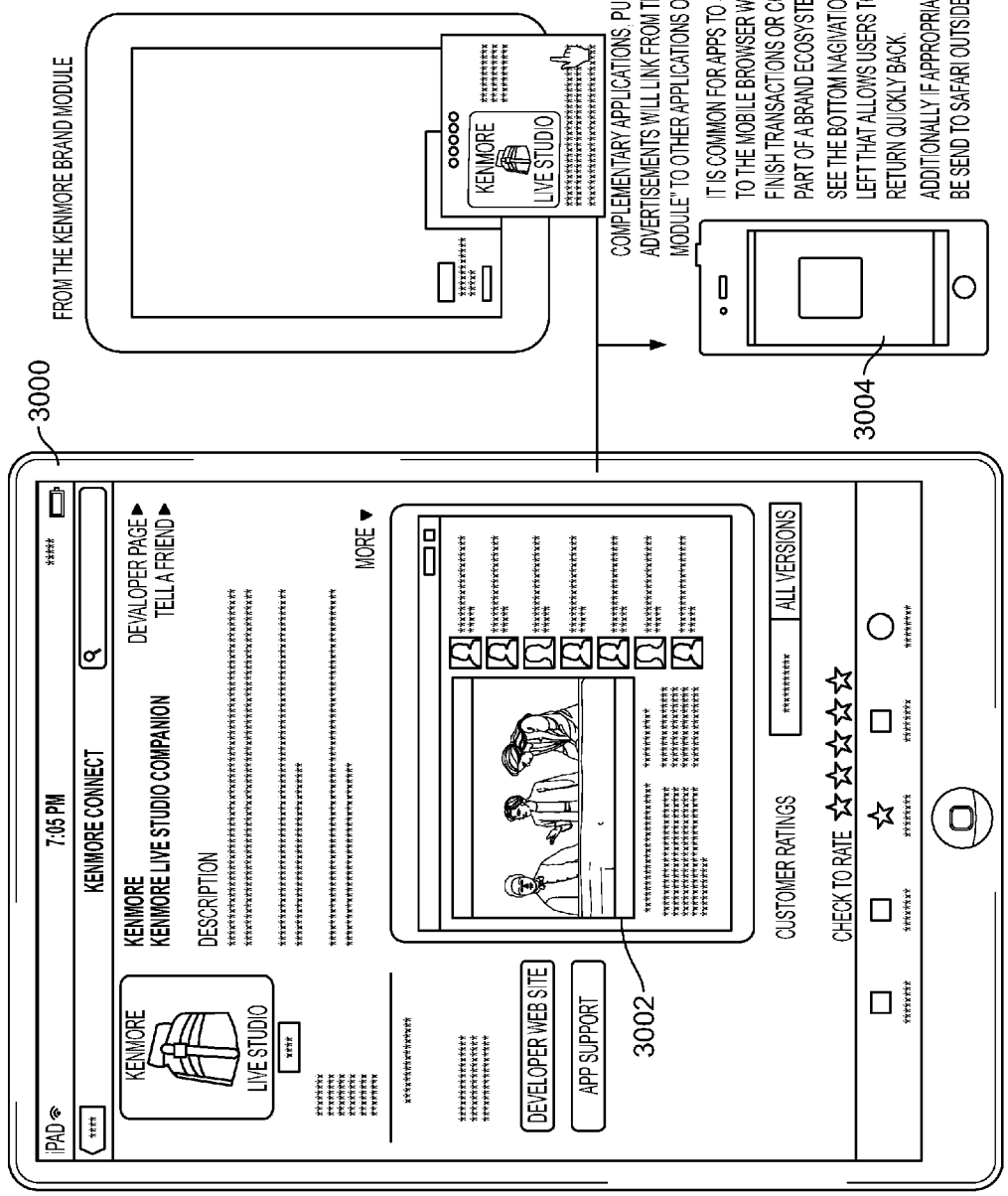
FIG. 30 is a graphical representation of a tablet device and a mobile device showing possible screen layouts/dashboards that incorporate links to companion applications, mobile applications or Internet webpages.

Moreover, an application may incorporate links to other companion applications (PC-based, tablet-based, mobile-based, etc.), as shown in FIG. 30. The application 3000 may include a link 3002 to a complementary application to access additional information, make a purchase, etc. Upon accessing the link 3002, the companion application that the consumer is directed to might be associated with the application or might be third-party owned and operated. Alternatively, the application may incorporate a link to an Internet website 3004. Upon accessing the link 3004, the displayed Internet website to which the consumer is directed might be associated with the application or might be third-party owned and operated.

The various components of the subject system may be connected using a variety methods and technologies. For example, and by no means limiting, a hub 3100 may connect to various networked appliances 3102 using WiFi or Zigbee communication protocols. Any legacy appliance not compatible with WiFi or Zigbee may nevertheless connect to the subject system using a Smart Plug 3104. It is contemplated that the networked appliances 3102 might include appliances located out of the physical home, e.g., garage door openers, sprinkler systems, and pool pumps 3102*d* or at an even more remote location and still be controlled via a PC, Tablet and/or mobile device 3106.

While various concepts have been described in detail, it will be appreciated by those skilled in the art that various modifications and alternatives to those concepts could be developed in light of the overall teachings of the disclosure. For example, while various aspects of the invention have been described in the context of functional modules, it is to be understood that, unless otherwise stated to the contrary, one or more of the described functions and/or features may be integrated in a single physical device and/or a software module, or one or more functions and/or features may be implemented in separate physical devices or software modules. Further, while various aspects of the invention have been described in the context of a particular type of application (e.g., tablet, mobile, etc.), it is to be understood that, unless otherwise stated to the contrary, one or more of the described application functions, features, and/or aspects may be integrated into other application types. It will also be appreciated that a detailed discussion of the actual implementation of the modules used to perform the various described functions is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person knowledgeable in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

What is claimed is:

1. A method for recommending products to a user of an appliance having a processing device and at least one sensor installed in the appliance in communication with the processing device, comprising:
   gathering, via the at least one sensor, data indicative of usage of a consumable within the appliance and energy usage for the appliance;
   processing, by the processing device, the gathered data to determine an amount of the consumable remaining and a cost of operation of the appliance for a particular time period based on at least the energy usage for the appliance;
   providing a diagnostic report directed to the use of the consumable within the appliance and the cost of operation of the appliance for the particular time period;
   providing a graphical user interface as part of the diagnostic report that is configured to provide do-it-yourself instructions, live communication capabilities with a service technician, and scheduling capabilities for setting up an appointment with the service technician; and
   providing a recommendation to reduce the cost of operation for the appliance for the particular time period by a specified amount.

2. The method as recited in claim 1, comprising automatically placing an order for the consumable with a vendor.

3. The method as recited in claim 2, wherein the consumable is delivered to a user of the appliance.

4. The method as recited in claim 2, wherein the consumable is readied for pickup by a user of the appliance.

5. The method as recited in claim 1, comprising providing an incentive to purchase a particular brand of the consumable.

6. The method as recited in claim 1, wherein an initial amount of the consumable is provided to thereby allow for a determination of an amount of consumable remaining as the consumable is used with the appliance.

7. The method as recited in claim 6, wherein the initial amount of the consumable is manually entered by a user.

8. The method as recited in claim 6, wherein the initial amount of the consumable is automatically determined using purchase information associated with the consumable.

9. A method for recommending products to a user of a washing machine having a processing device and at least one sensor installed in the appliance in communication with the processing device, comprising:

gathering, via the at least one sensor, data indicative of usage of a detergent within the appliance and energy usage for the washing machine;

processing, by the processing device, the gathered data to determine an amount of the detergent remaining a cost of operation of the washing machine for a particular time period based on at least the energy usage for the washing machine;

providing a diagnostic report directed to the use of the detergent within the appliance and directed to the cost of operation of the washing machine for the particular time period, wherein the diagnostic report indicates that a wrong type of detergent is used in the washing machine or that an amount in excess of a recommended amount is being consumed during operation of the washing machine; and providing a graphical user interface as part of the diagnostic report that is configured to provide do-it-yourself instructions, live communication capabilities with a service technician, and scheduling capabilities for setting up an appointment with the service technician.

10. The method as recited in claim 1, wherein the appliance comprises a dish washer and the consumable comprises at least one of detergent and a rinsing agent, or wherein the appliance comprises a dryer and the consumable comprises a drying sheet.

11. The method as recited in claim 1, comprising:
sharing energy usage or energy cost of operating the appliance for a time period with user's social media; and
comparing the energy usage or the energy cost of operating the appliance with the energy usage or the energy cost of operating a same type of appliance by another user on the user's social media over the time period.

12. The method as recited in claim 1, wherein the diagnostic report indicates that an amount of consumable in excess of a recommended amount of consumable is being used during operation of a cycle of the appliance.

13. The method as recited in claim 1, wherein the diagnostic report indicates that the consumable being used is not a recommended consumable for use by the appliance and its use is causing a problem for the appliance.

14. The method as recited in claim 1, wherein the diagnostic report provides feedback with respect to the consumable being used by the appliance, wherein the feedback indicates a problem that the consumable is causing for the appliance, and wherein the feedback recommends a change with respect to the consumable to fix the problem.

15. The method as recited in claim 1, wherein the diagnostic report provides feedback to overcome a diagnosed problem with respect to the consumable being used within the appliance.

16. The method as recited in claim 1, wherein the diagnostic report is directed to the consumable being used within the appliance and includes a suggestion to replace the consumable with a different kind of consumable so that appliance can operate properly.

17. The method as recited in claim 1, comprising suggesting a particular consumable to extend a life of the appliance.

18. The method as recited in claim 1, comprising providing feedback relating to the consumable and a correct use of the consumable within the appliance.

19. The method as recited in claim 1, comprising providing feedback relating to amount of consumable being used for an appliance cycle.

20. The method as recited in claim 1, comprising providing maintenance tip relating to the consumable being used in the appliance.

21. The method as recited in claim 1 comprising:
sharing the energy usage data with an online social networking website; and
comparing the energy usage data with community energy usage data in a particular geographical area.

22. The method as recited in claim 1 comprising providing a notification that the consumable needs to be replaced when the amount of the consumable remaining is at or below a predetermined level.

23. The method according to claim 1, providing, to a mobile application, coupons and suggestions for replacement consumables based on sensed usage of the consumable within the appliance.

* * * * *